(12) United States Patent
O'Neil et al.

(10) Patent No.: US 6,808,267 B2
(45) Date of Patent: Oct. 26, 2004

(54) METHOD FOR AUTOMATED MASS SCREENING FOR VISUAL DYSFUNCTION IN CHILDREN

(75) Inventors: James W. O'Neil, Phoenix, AZ (US); Richard S. Tirendi, Phoenix, AZ (US); Charles D. Tardibuono, Chandler, AZ (US)

(73) Assignee: Childsplay Vision Systems, Phoenix, AZ (US)

(*) Notice: Subject to any disclaimer, the term of this patent is extended or adjusted under 35 U.S.C. 154(b) by 1 day.

(21) Appl. No.: 10/274,167

(22) Filed: Oct. 18, 2002

(65) Prior Publication Data

US 2004/0076942 A1 Apr. 22, 2004

(51) Int. Cl.[7] .............................. A61B 3/00; A61B 3/02
(52) U.S. Cl. ...................... 351/246; 351/223; 351/239; 463/23
(58) Field of Search ................................ 351/200, 201, 351/222, 223, 237, 239–243, 246; 345/700, 705, 707, 709; 463/1, 23; 434/350; 600/558

(56) References Cited

U.S. PATENT DOCUMENTS

| | | |
|---|---|---|
| 4,567,513 A | 1/1986 | Imsand |
| 4,978,303 A | 12/1990 | Lampbell |
| 5,026,151 A | 6/1991 | Waltuck et al. |
| 5,206,671 A | 4/1993 | Eydelman et al. |
| 5,357,277 A | 10/1994 | Nakayoshi et al. |
| 5,436,681 A | 7/1995 | Michaels |
| 5,678,571 A | 10/1997 | Brown |
| 5,694,199 A | 12/1997 | Rodriguez |
| 5,825,460 A | 10/1998 | Kohayakawa |
| 5,828,943 A | 10/1998 | Brown |
| 5,946,075 A * | 8/1999 | Horn .......................... 351/246 |
| 6,030,226 A | 2/2000 | Hersh |
| 6,033,073 A * | 3/2000 | Potapova et al. ........... 351/211 |
| 6,033,076 A * | 3/2000 | Braeuning et al. .......... 351/224 |
| 6,108,634 A | 8/2000 | Podnar et al. |
| 6,227,862 B1 | 5/2001 | Harkness |
| 6,260,970 B1 * | 7/2001 | Horn .......................... 351/246 |
| 6,364,845 B1 * | 4/2002 | Duffy et al. ................. 600/558 |
| 6,652,458 B2 * | 11/2003 | Blazey et al. ............... 351/210 |

OTHER PUBLICATIONS

Thomas Software Solutions—Vision Screener for Schools—49 Wroxham Gardens, Potters Bar, Herts UK.

* cited by examiner

*Primary Examiner*—Brian L. Casler
*Assistant Examiner*—John R. Sanders
(74) *Attorney, Agent, or Firm*—Cahill, von Hellens & Glazer, P.L.C.

(57) ABSTRACT

A method for automatically screening for visual dysfunctions in preliterate or pre-school test subjects incorporates collecting personal profile and background information and transferring the information to a local storage system. The information is retrieved into a PC system and a test procedure is initiated with a test subject by establishing an exclusive dialog between the test subject and the PC system. The test procedure is in the form of a game selectively attractive and readily understood by preliterate or school-age test subjects. The test results are printed for presentation to the test subject and are also transmitted together with the background information to an off-site repository for storage with test results and information of other test subjects. An epidemiological analysis is made of the stored test results and information in accordance with a predetermined analysis protocol. A report is generated representing the results of the analysis.

26 Claims, 22 Drawing Sheets

Profile Data Entry

Student Selection List

Anderson, J

Mike Stanford
Luann Smith
Ryan Turner
Julie Underwood
Kara Walker

District: School District   Proctor's Name: Proctor's Name

School: School

State: State

School Year: 2002-2003

Student Name: Student Name   Class: Class

Date of Birth: 01/10/1999   Teacher: Teacher

Home Room: Home Room

Medical History
Disability: Known Disability
Disability: Known Disability

☐ Check box if child wears glasses or contacts.
☐ Check box if child has a known developemental delay.
☐ Check box if child has been diagnosed with ADD.

Select Race: caucasian ▼

Add Student    Delete Student

Edit Student    Test Student

Print Referral

Figure 2

VISION ASSESSMENT SCREENING SUMMARY

Name: John Doe
DOB: January 1, 1999
School: Henderson Pre-School

Date: April 15, 2002
Teacher: Mrs. Mary Smith
Proctor: Mrs. Mary Smith

| COLOR VISION | VISUAL ACUITY | |
|---|---|---|
| Protanope Suspected | Right Eye | Left Eye |
| (red color deficiency) | 20/400 | 20/30 |
| STEREOPSIS | BINOCULARITY | |
| "Depth Perception" | "Eye Alignment" | |
| Detected | 14 prism diopters esotropic | |
| 600 sec / arc | (inward crossing of eyes) | |

The results above indicate that this child needs a referral to an eye care professional for further examination.

If you don't have an eye care professional, several eye care professionals in your locale are:

| | | | |
|---|---|---|---|
| Dr. Atkins | 123 Main St. | Anytown | (800) 555 - 1234 |
| Dr. Sears | 234 Apple Pl. | Nexttown | (888) 555 - 2772 |
| Dr. Seuss | 92 Funny Ln. | Whoville | (800) 555 - 5555 |
| Dr. Tirendi | 4143 E. Rock Rd. | Bigtown | (800) 555 - 7190 |

Figure 8

EYE DOCTOR VISION REPORT

*ATTENTION PARENT! Please bring this form with you to your eye doctor appointment and then return completed form to your child's teacher.*

Name: John Doe  Screened: April 15, 2002
DOB: January 1, 1999  Teacher: Mrs. Mary Smith
School: Henderson Pre-School  Proctor: Mrs. Mary Smith

| | | | | |
|---|---|---|---|---|
| Is visual acuity normal? | Right Eye Y N | | Left Eye Y N | |
| Were eyeglasses prescribed? | Y N | | | |
| Should student were glasses? | Full-Time    Reading Only   Other (please describe)_____ | | | |
| Is vision normal with glasses? | Right Eye Y N | | Left Eye Y N | |
| Diagnosis? | Myopia    Hyperopia    Astigmatism   Other (please describe)_____ | | | |
| Is child legally blind? | Right Eye Y N | | Left Eye Y N | |
| Is child visually impaired? | Right Eye Y N | | Left Eye Y N | |
| Is a vision teacher required? | Y N | | | |
| Are low vision aids needed? | Y N | | | |
| Should seating be in front of class? | Y N | | | |
| Re-exam in _____ months / _____ years. | | | | |
| Other comments or co-existing medical conditions:_____ | | | | |

*Eye Care Professional Information*

MD / DO / OD

_____
Name

_____
Address

_____
City, State, Zip

_____
Phone

_____
Fax

_____
Today's Date

Figure 9

| Right Eye | | | | | | | |
|---|---|---|---|---|---|---|---|
| Screening<br>One letter per level | | Phase 1<br>Start 2 levels above letter failed in screening. If failed (2 missed), go up chart (and do not come back down). If passed (3 of 3 or 4 of 5 correct), continue down chart until 2 letters are missed at a level | | | | | |
| 20/400 | ' | 20/400 | ' | ' | ' | ' | ' |
| 20/320 | ' | 20/320 | ' | ' | ' | ' | ' |
| Skip 20/280 | | Skip 20/280 | | | | | |
| 20/240 | ' | 20/240 | ' | ' | ' | ' | ' |
| 20/200 | ' | 20/200 | ' | ' | ' | '. | '. |
| 20/160 | ' | 20/160 | ' | ' | ' | ' | ' |
| 20/125 | ' | 20/125 | ' | ' | ' | ' | ' |
| 20/100 | ⊙ | 20/100 | ' | ' | ' | ' | ' |
| 20/80 | ⊙ | 20/80 | ' | ' | ' | ' | ' |
| Skip 20/70 | | Skip 20/70 | | | | | |
| 20/60 | ⊙ | 20/60 | ' | ' | ' | ' | ' |
| 20/50 | ⊙ | 20/50 | ⊙ | ⊙ | ✕ | ⊙ | ⊙ |
| 20/40 | ⊙ | 20/40 | ⊙ | ⊙ | ⊙ | ' | ' |
| 20/30 | ✕ | 20/30 | ⊙ | ✕ | ✕ | ' | ' |
| 20/25 | ' | 20/25 | ' | ' | ' | ' | ' |
| 20/20 | ' | 20/20 | ' | ' | ' | ' | ' |
| | | 20/15 | ' | ' | ' | ' | ' |

Figure 10 A

| Right Eye ||||||||
|---|---|---|---|---|---|---|---|
| Reinforcement <br> Test only 3 letters (1 Letter per level); start 3 levels above failed level in phase 1 or at 20/400 ||| Phase 2 <br> Start at last level failed in phase 1. As soon as 2 letters at a level are missed, stop. |||||
| • | • | • | | | | | |
| | | | 20/320 | • | • | • | • | • |
| Skip 20/280 ||| Skip 20/280 | | | | | |
| | • | | 20/240 | • | • | • | • | • |
| | • | | 20/200 | • | • | • | • | • |
| | • | | 20/160 | • | • | • | • | • |
| | • | | 20/125 | • | • | • | • | • |
| | • | | 20/100 | • | • | • | • | • |
| | • | | 20/80 | • | • | • | • | • |
| Skip 20/70 ||| Skip 20/70 | | | | | |
| | ⊙ | | 20/60 | • | • | • | • | • |
| | ⊙ | | 20/50 | • | • | • | • | • |
| | ⊙ | | 20/40 | • | • | • | • | • |
| | • | | (20/30) | ✗ | ⊙ | ⊙ | ⊙ | ⊙ |
| | • | | 20/25 | ✗ | ✗ | • | • | • |
| | • | | 20/20 | • | • | • | • | • |
| | | | 20/15 | • | • | • | • | • |

Figure 10 B

METHOD FOR AUTOMATED MASS SCREENING FOR VISUAL DYSFUNCTION IN CHILDREN

FIELD OF THE INVENTION

The present invention relates to automated mass screening for visual dysfunctions in children and, more particularly, to a system utilizing computer software in an interactive video game format to facilitate the testing and collection of data for the mass screening of pre-literate or school-age children for visual dysfunctions.

BACKGROUND OF THE INVENTION

Typically, vision screening of children is performed manually, using some type of matching game. This method requires trained personnel to administer the screening. The requirement for trained personnel creates a logistical barrier for mass screening. Furthermore, the lack of standardization among different screeners raises concern over accuracy and consistency.

Recently, photographing the eye's red reflex has been proposed as an alternative way of evaluating for vision problems in children. In theory, photoscreening allows testing of very young or developmentally impaired children who could not otherwise cooperate with manual screening techniques. While intriguing, photoscreening does not check the child's vision. Photoscreening can only check for certain eye conditions which may impair vision. In addition, photoscreening requires specialized equipment and training. These limitations make photoscreening less desirable for use with children old enough to read an eye chart. Furthermore, interpretation on site of results for delivery at the test location is often not accurate. Offsite, professional interpretation improves accuracy but delays result and makes coordinating medical referrals difficult.

The third method to check a child's vision and screen for visual dysfunction such as amblyopia is a professional examination in an eye doctor's office. Although a full examination has the potential to be the most thorough method of screening for eye problems, it is not performed in the schools. Even if every child could visit an eye doctor's office, the costs would be overwhelming. Furthermore, not all eye doctors are trained the same. The lack of a standardized child's eye examination makes even this most expensive proposition subject to accuracy and reliability concerns. It also presents the possibility of over-prescription of eye services.

Leading experts in children's vision all agree that early vision screening is important. While manual screening, photoscreenings, and full eye examinations all have a role to play in detecting visual dysfunction in children, it is obvious we are not screening enough children with the current systems.

SUMMARY OF THE INVENTION

The present invention incorporates a method for collecting information for inclusion in a student database. The information is collected in a standardized format with standardized data consistent with the system's statistical requirements. This student database includes related information about individuals whose test data is to be collected. This information will include data pertaining to the student's background, such as medical history as well as information relating to test location, school location, and other data that is of statistical interest for the evaluation of the collected data, and will include test data for epidemiological analysis.

The collected student database background information is incorporated in a reporting environment wherein a software program in combination with a conventional PC is used to engage the child in a familiar video game format. As used herein, the term "PC" is intended to mean a computer system, regardless of the operating system that it uses or its source of design or manufacture, having a data input means such as a keyboard and including a monitor having a screen for displaying alphanumeric and graphic images. While the faster and more advanced systems may be desirable, the present method is intended to be used with conventional computer systems that are generally available in most schools and are therefore not required to have an unusually fast processing speed or large random memories. The child's natural desire to play games encourages and insures the child's participation. During the course of game play, the software automatically assesses for visual acuity, stereopsis, binocularity, eye alignment, and if appropriate color vision. In the embodiment chosen for illustration, a race car video game is selected to provide the testing motif to maximize the child's interest and participation. The particular game chosen to encourage the child's cooperation may vary; however, it is important that the game be standardized so that the same presentation is provided to all of the students and that variations in the test results do not result from the chosen game. It is important to note that no formalized training should be required of the administrator or proctor to administer the test. It is critical that the test be essentially an exclusive dialog between the child under test and the testing system. The proctor must not intervene, coach, give directions, or assist the child under test in any manner once the test is begun. The method of the present invention eliminates variations in the training of proctors and provides a system wherein the test may be administered by anyone, even with the most rudimentary of computer skills. The need to train large number of volunteers to perform vision screening is therefore unnecessary. The simplified logistics of vision screening with this method allow children to be tested at any time of any day and previously disrupting influences, such as school absences or late-year transfers, will not affect the test results nor will it result in a missed screening.

The method of the present invention provides a test that is completely standardized from child to child independent of when or where it is performed and permits automated standardized nationwide testing and collection of data to permit analysis and evaluation. Primarily in the form of software, it is easy to disseminate using computer technology widely available at schools throughout the United States and elsewhere. Testing paradigms are based on accepted vision assessment protocols to ensure accuracy.

The motor skills required by the child being tested are within the capabilities of most 3 year olds and certainly within the capabilities of four year olds and up. Motor responses are monitored during game play and test presentations are dynamically adjusted by the software to eliminate inattention or motor skill difficulties as sources of inaccuracy. An additional element of the computerized method of the present invention is the provision for the storage and collation of data locally and in a remote centralized database. This is the only method that can automatically track the success of vision screening programs. Customized reporting is provided for epidemiological studies and can be tailored to virtually any specific request.

BRIEF DESCRIPTION OF THE DRAWINGS

The present invention may more readily be described by reference to the accompanying drawings, in which:

FIG. 2 shows a data entry screen visible on the PC for entering background information and personal profile information with respect to a student test subject.

FIGS. 8 and 9 are reports made available after the conclusion of the screening test that provide information to the student test subject's parents or guardians, including an assessment of the screening test together with a report for use with an eye care professional.

FIGS. 10A and 10B are illustrations of a reporting scheme for the visual acuity portion of a screening test for the right eye.

DESCRIPTION OF THE PREFERRED EMBODIMENT

Figure 1A:
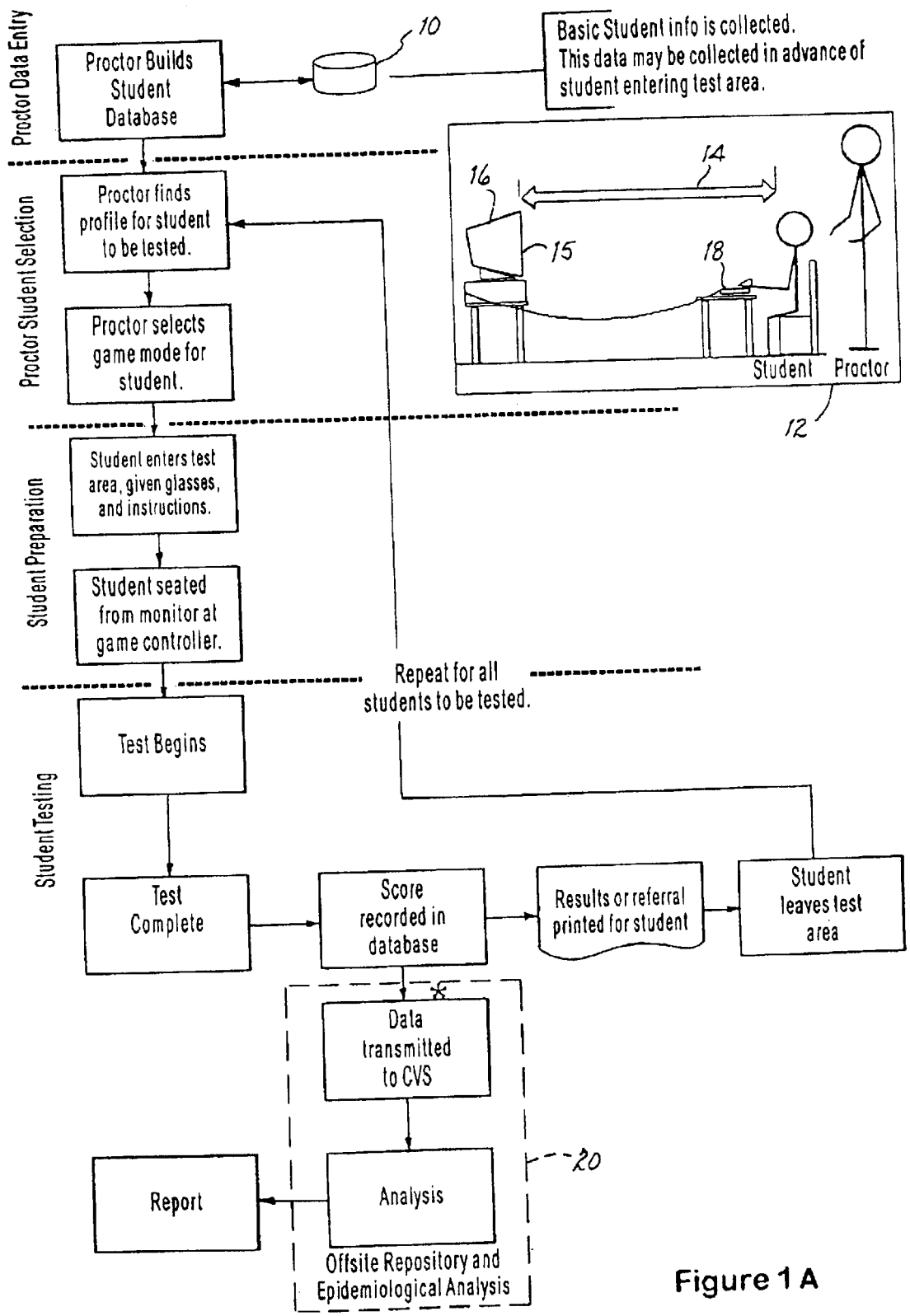
FIG. 1A is a method flow diagram for a system implementing the method of the present invention.
Figure 1:
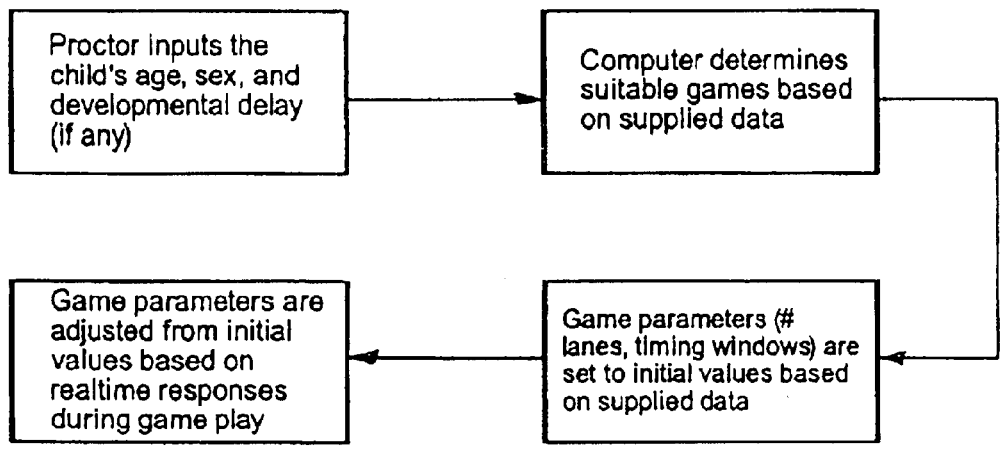
FIG. 1B is a representation of a portion of FIG. 1A showing greater detail of the function of the method in response to the receipt of student database information.
FIG. 1C is an overview of the test method.
Figure 1:
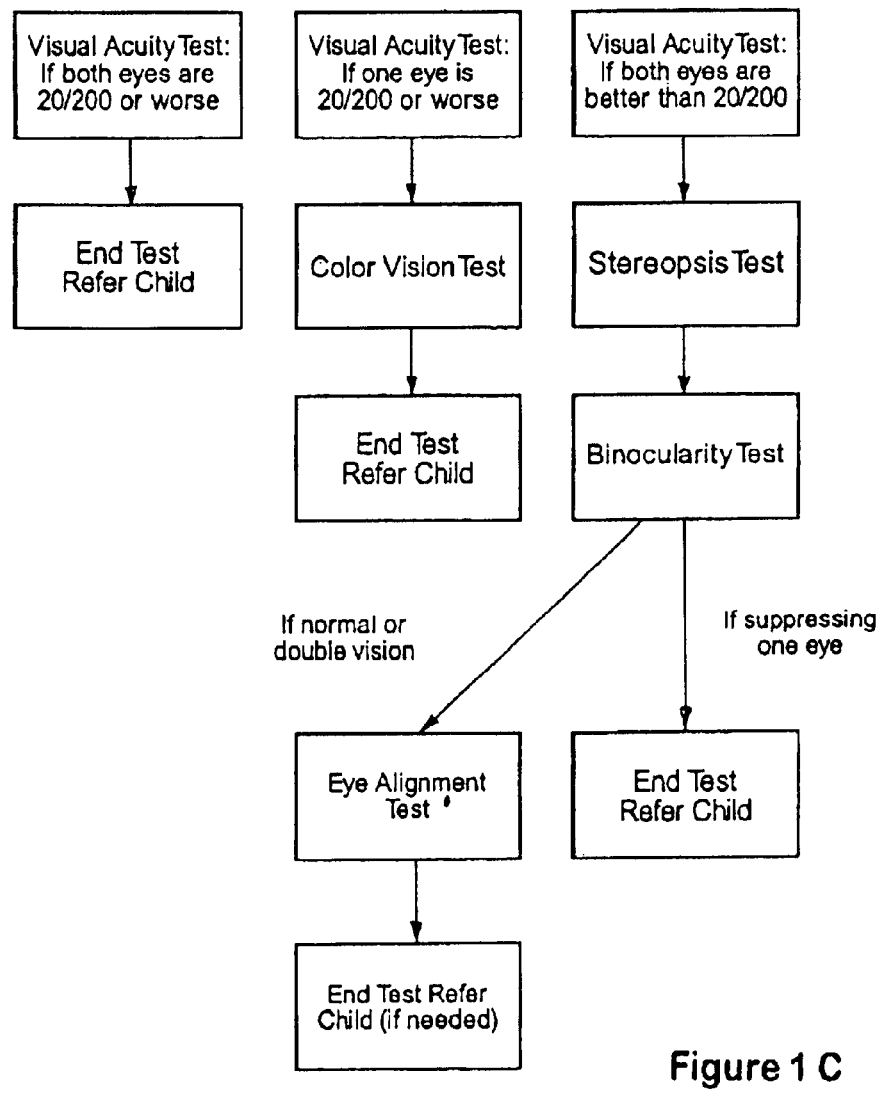

Referring to FIG. 1, a flow diagram of a system incorporating the method of the present invention is shown. Test subject or student test subject basic information is collected either prior to or at the time the test subject is to be screened. The information is entered into a suitable local storage system 10 which may take any convenient form such as a computer memory or electronic storage medium. The information will include personal profile data such as medical history, statistically relevant data, such as race, and background information concerning location, time, organization, such as school where the screening test is to be administered. This data entry profile is shown in a sample format in FIG. 2, wherein it may be seen that a plurality of student test subjects, with the accompanying personal profile and background information, may be entered into the data storage medium. The information will normally be entered by an administrator or proctor who may be a volunteer or an employee of a school who need only have a minimal familiarity with personal computers. It is important to note that the proctor will not enter into the adminstration of the test, the interpretation of the test, nor will the proctor interfere with the exclusive dialog established between the test subject and the PC upon which the method of the present invention is being implemented. As stated previously, the use of the term "PC" is intended to mean a computer system that may generally be available at the respective test locations. It is unimportant what operating system is utilized in the computer nor is the type, kind, or manufacture of the computer important. Typically, such computers incorporate a random memory, a hard disc memory, a monitor and a data input means such as a keyboard and/or a joy stick. When the student is to be tested, the stored information is retrieved from local storage and entered into the PC system for use with the test data to be gathered by the test. The student test subject is seated in an appropriate room, schematically illustrated in FIG. 1 at 12, a predetermined distance (illustrated by the arrow 14 in FIG. 1) from the test screen 15 of the PC 16. A keyboard 18 or similar control device, such as a joystick, is provided to the student to permit the student to interact with the program being executed on the PC. The student is then provided with glasses and instructions, to be described more fully hereinafter, and the program is initiated to begin the test.

The test follows a dynamically self-adjusted routine to test the student subject's visual acuity, stereopsis, binocularity, eye alignment and if appropriate, color vision. The preferred test procedures will be described more fully hereinafter.

Upon completion of the test, the information accumulated in the PC through the interaction of the student test subject with the PC and program is sent to and stored in the local storage system 10 for subsequent local use. The results of the test and the possible referral to a vision professional may be printed and provided to the student test subject, the parent, or guardian.

Significantly, this test data is transmitted to a remote data center 20. Specifically, the data is transmitted to a collection and verification system where the data is combined with similar data from other locations in an off-site repository. The data is available for epidemiological analysis and for the selective access of desired information to produce reports of interest to an investigator.

After completion of data entry by the adult proctor, the child whose visual performance is to be evaluated (student) will be seated the pre-determined distance (for example, 6 feet) in front of the computer monitor or test screen 15. The testing distance will determine the required cord length of the input device (keyboard, steering wheel, joystick, etc.). An infrared sensor may also be used to monitor the minimum testing distance and prevent violation of the working distance by excessive leaning forward of the student. This latter sensor would stop testing momentarily and automatically provide auditory instructions to sit back in the proper position before testing would resume. Eyeglasses would be used to disassociate the right eye from the left eye. Different optical principals could be used to separate the visual input presented to each eye depending on the needs of a particular testing situation. Examples would include wavelength (different colored lenses), polarized lenses, flicker fusion glasses, or selectively occlusive lenses (for example liquid crystal technology). A +0.50 diopter convex lens would be added to such occlusive lenses to adjust for the working distance of 6 feet.

At this point, the exclusive dialog between the student test subject and the system is initiated and further contact with, or interface with the proctor ceases. It is important that no further contact be initiated or tolerated between the proctor and the student test subject. The exclusive dialog between the test subject and the system provides uniformity and standardization of the responses of the subject for proper scientific comparison in the subsequent analysis of collected data. The computer program selects the test to be administered based on the data supplied concerning the test subject such as age, sex and developmental characteristics that affect the game selection or the game parameters. The program also establishes default values for the selected game such as response timing (the time limit for response to events during the game). For example, the time allowed for the subject to select a response when presented with choices during the game. The timing is adjusted and is maintained at a value to insure the subject's attention without requiring unusual dexterity or without boring the subject. The test proceeds in an automated sequence to first insure that the student test subject fairly understands the purpose and goals of the game, and then proceeds with the administration of appropriate tests for screening visual acuity, stereopsis, binocularity, eye alignment and color vision (if appropriate). The test must be carefully chosen to be readily comprehensible by pre-literate and school-age test subjects. A video game format has been found to be most attractive since it can be inherently interesting (and thus incorporates incentives to learn and understand the test). The game must be simple but interesting and present a readily acceptable challenge to the test subject while rewarding performance by audio or visual presentations. Most importantly, the test must provide consistently objective results to permit data correlation among test results of many test subjects. The game chosen for illustration is a very simple race car that is viewed on the PC monitor traveling a simple multi-lane road. Control of the race car is deliberately chosen to be limited to basic selections of the lane in which the car is moving. Other game formats may be used, but the game must be simple, basic, readily understood (after demonstration by the program), and not be dependent on motor skills in any way that would affect vision test results. It is important that the method of the present invention engage the test subject child with a non-threatening environment; further, the cognitive skill required must be age appropriate to ensure comprehension. Further, the motor skill required to interact with the test game must be age appropriate. Thus, the computer program determines the suitable game based on the supplied data previously entered into the PC from the database.

Referring to FIG. 1B, an overview of the method of the present invention is shown wherein the input derived from the stored information originally provided by the proctor concerning the child's age and other relevant background information, when entered into the PC system at the beginning of the test, will result in the selection by the program of a suitable game. Initial parameters of the game, and in the chosen illustration, the number of lanes that the race car must travel in, the timing windows are set to initial values to determine the time within which the student must respond are inputted to the system to control the application of the test to the student. It may also be noted that these game parameters are scrutinized by the system during the application of the test so that initial or default values of the perimeters can be adjusted in accordance with the timing of the responses of the student under test.

A game demonstration phase automatically and passively demonstrates the operation of the game. During this phase the student does not provide any input to the system. The student simply observes the video game and accompanying audio describing the goal of the game and how to provide the necessary input into the system. Immediately following this demonstration phase, the game begins the comprehension Pre-Test Phase where comprehension is verified.

If during the comprehension Pre-Test Phase, the student fails to demonstrate comprehension, an alternative motif, such as different standardized game format may be offered. As with the primary motif (the raceway game) the student will observe a demonstration phase, followed by a Pre-Test verification of comprehension. If this comprehension Pre-Test is failed by the student, a print-out will refer the student for a professional eye examination. Whether the inability to verify comprehension was due to poor vision or lack of comprehension, the referral is printed indicating that the student was not tested.

Figure 3A:
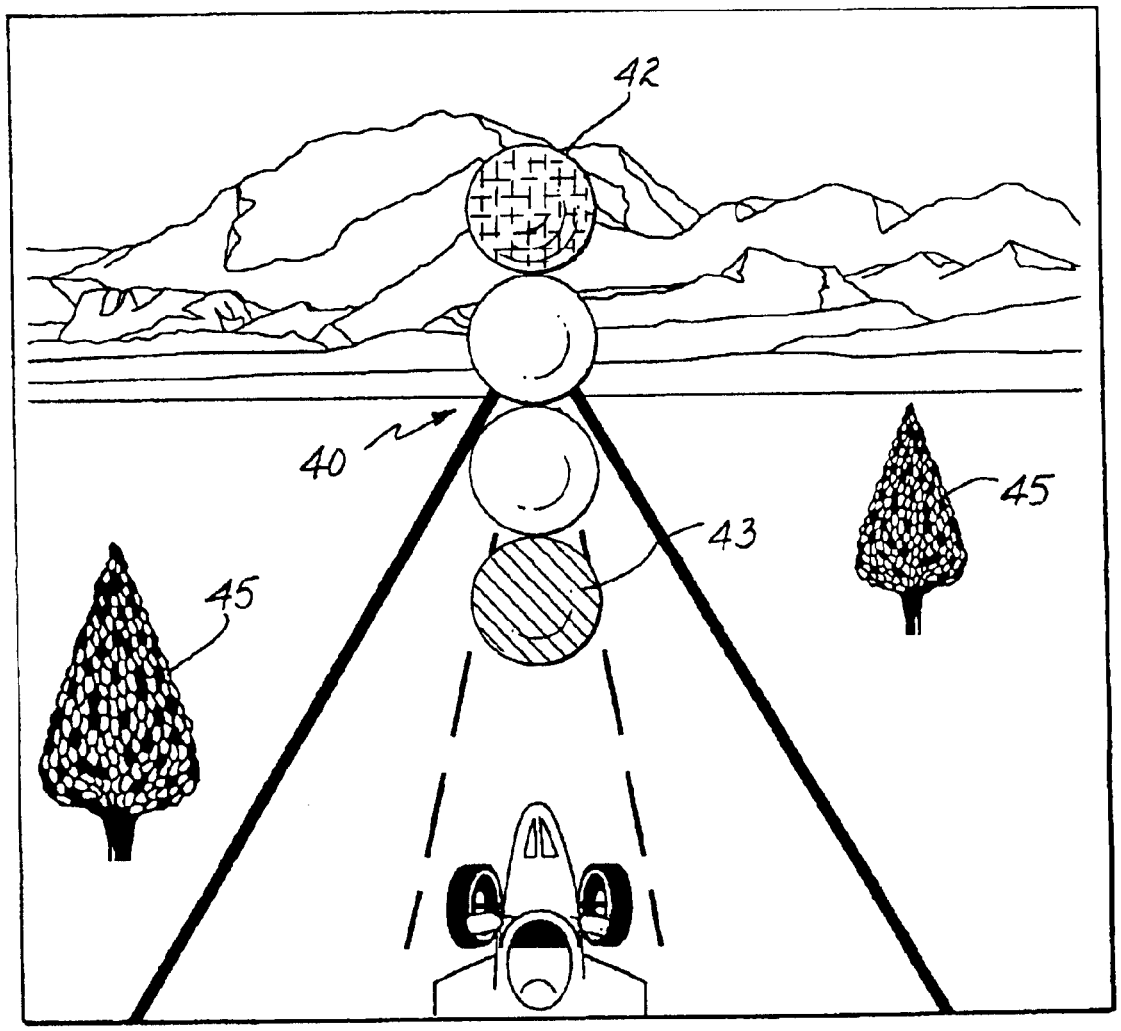
FIG. 3A is an illustration of the starting position of a screening test.

At the beginning of the screening test, the students will see a light pole 40 (FIG. 3A) above the image of the car they will be "driving". The lights will illuminate one at a time, from the top, starting with the first amber light 42 down to the green light 43. When the green light illuminates, the light pole will disappear and the test/game will begin.

At this time, motion will be simulated by the apparent movement of the road stripes and trees 45 that will pass on either side of the road. The complexity of the scene is designed to be simple in order to minimize the performance requirements for school computers (many computers will be older and less capable) and to minimize distractions, allowing the student to focus on the test letters.

The first test undertaken under the automatic control of the program is the visual acuity pre-test. The pre-test phase is designed to understand the student's comprehension of the goal of the game. A correct response can be made by any child regardless of color vision abnormalities.

Figure 4:
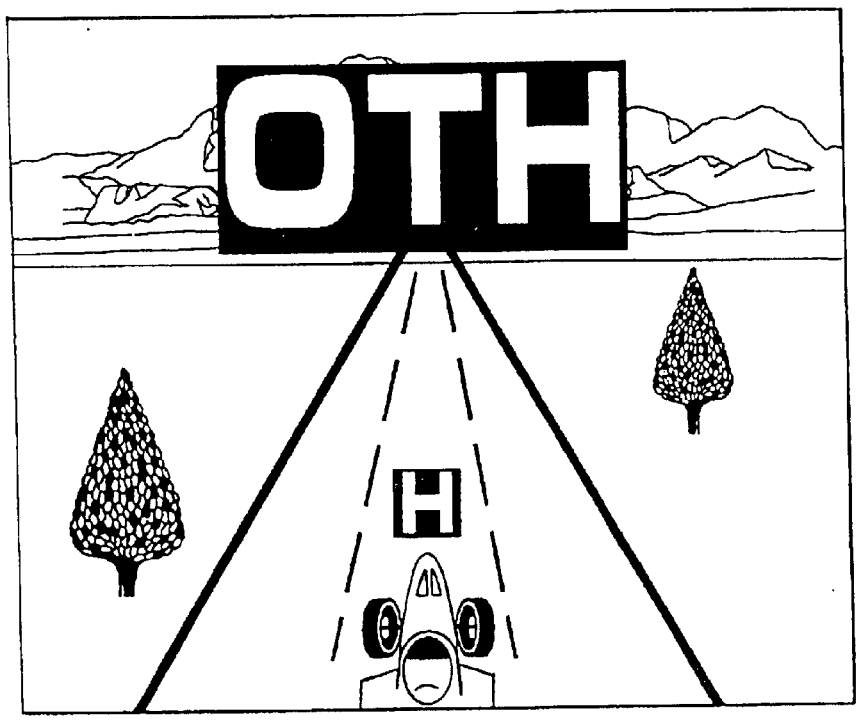
FIG. 4 is an illustration of the test screen illustrating the beginning of a test using Snellen letters with the banner letters at midpoint.
Figure 18:
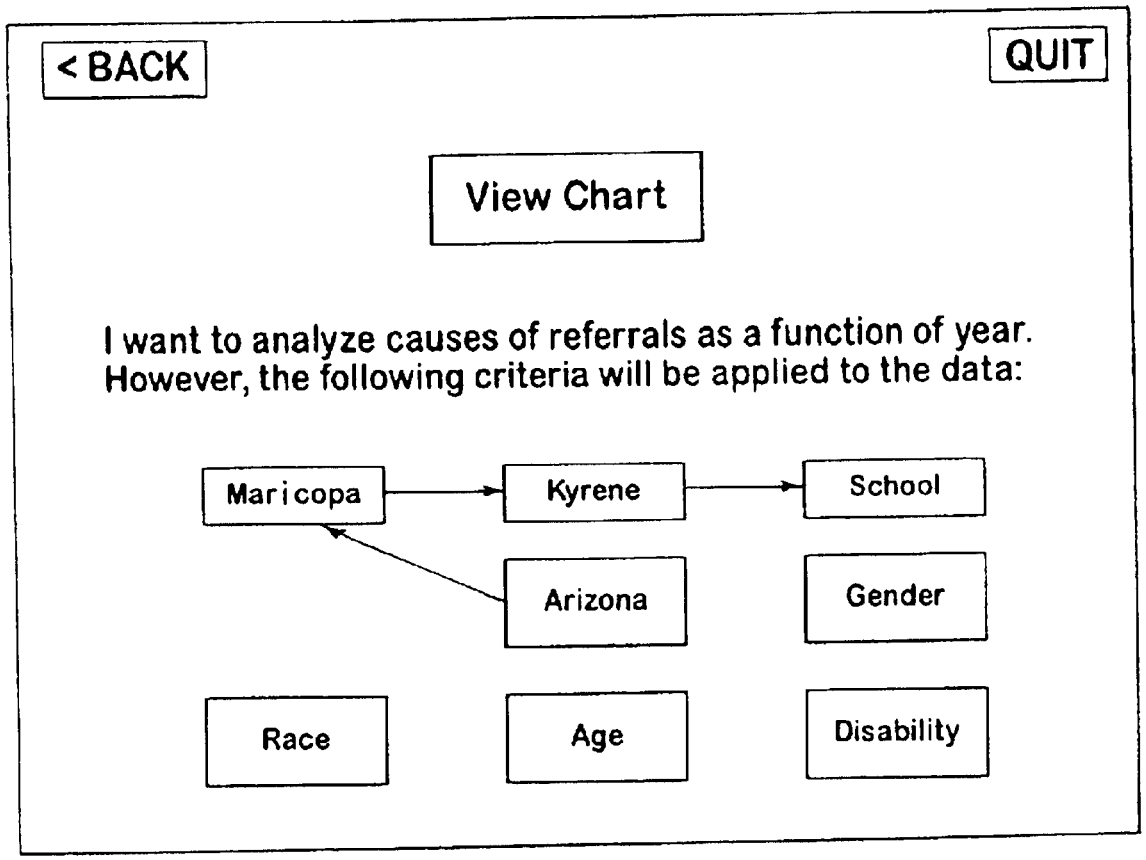
FIG. 18 is an illustration of a representative presentation useful in describing the selection of specific categories of relevant data for analysis.
Figure 19:
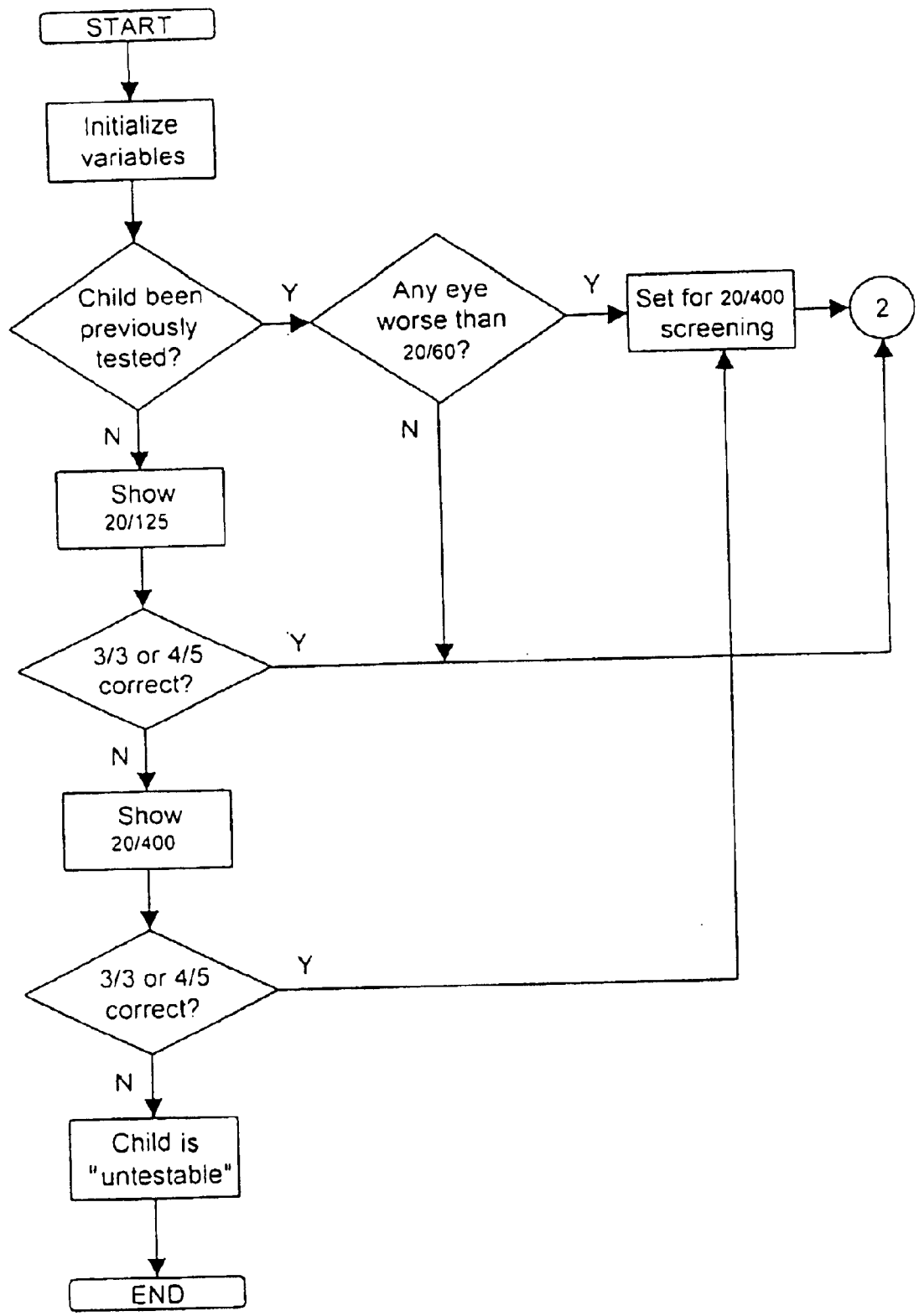
FIG. 19 is a program flow diagram of the binocular pre-test phase of the screening test.
Figure 20:
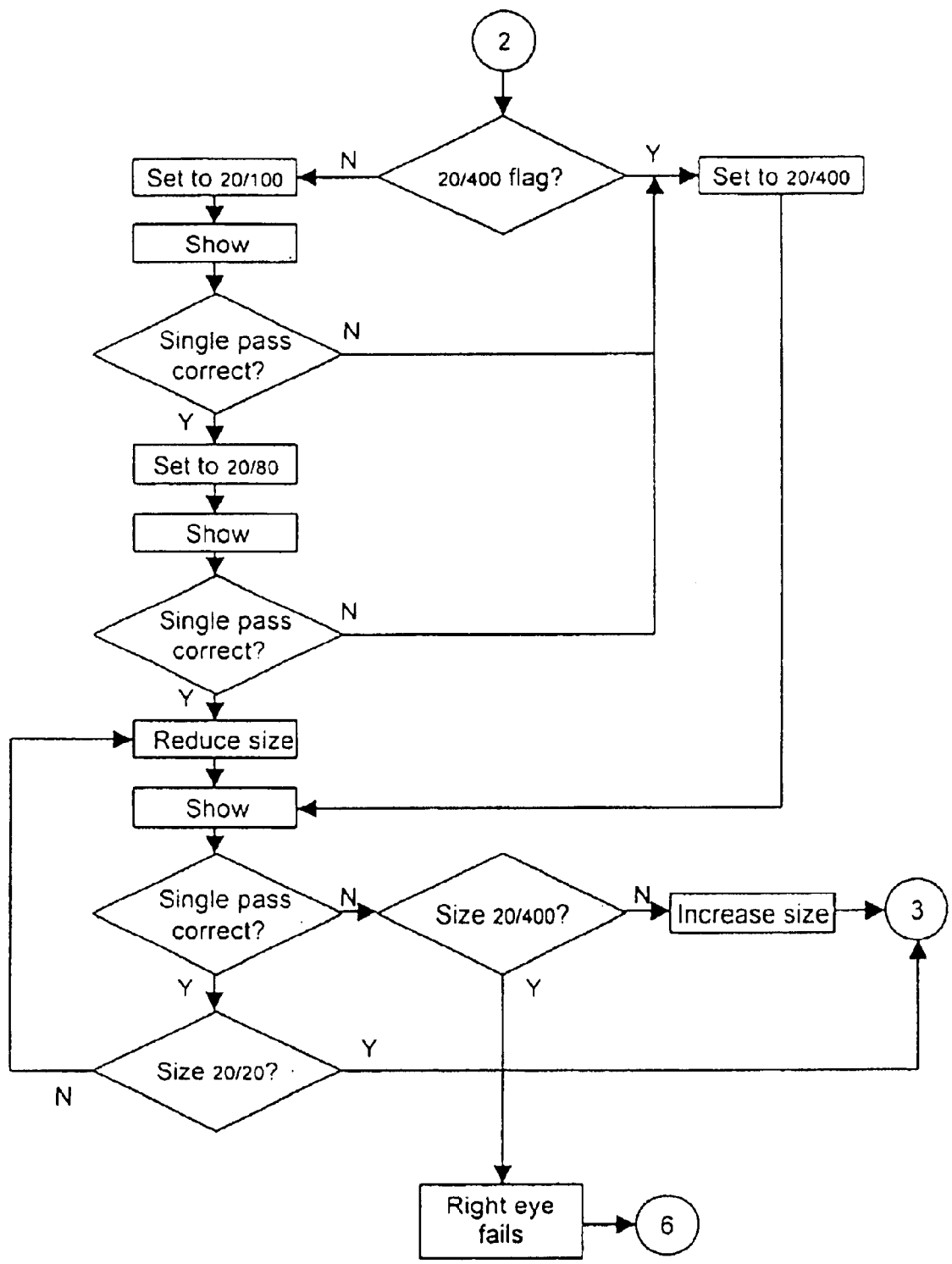
FIG. 20 is a program flow diagram of the screening module of the screening test.
Figure 21:
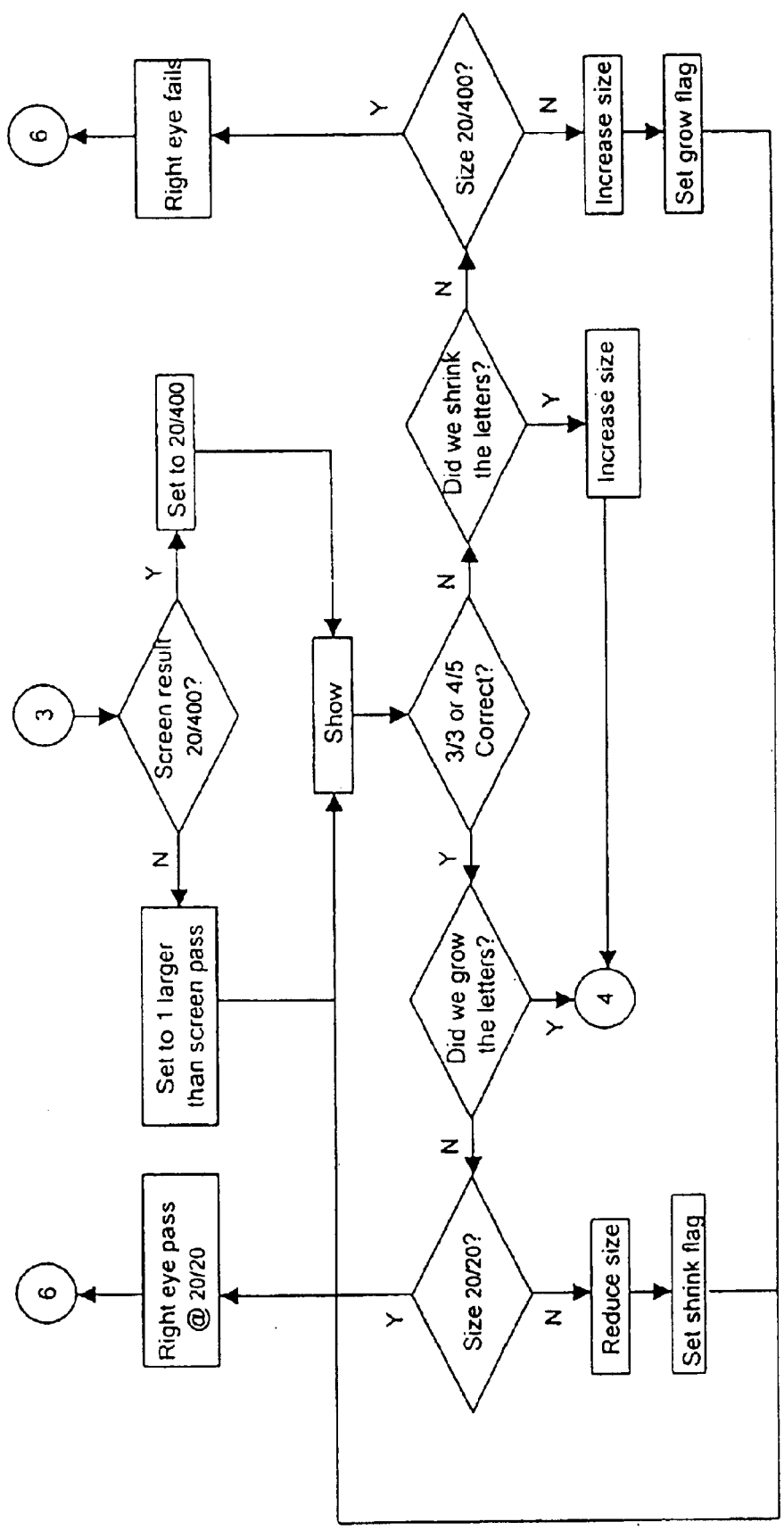
FIG. 21 is a program flow diagram of the monocular phase I of the screening test.
Figure 22:
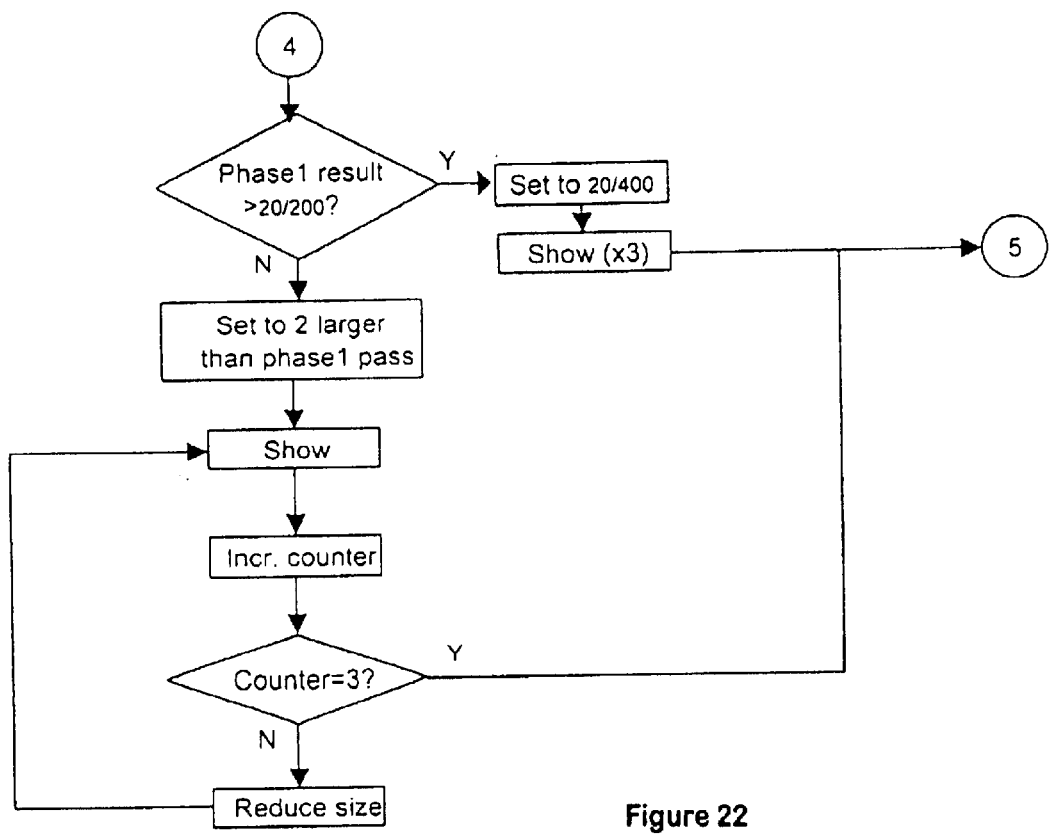
FIG. 22 is a program flow diagram of the reinforcement phase of the screening test.
Figure 23:
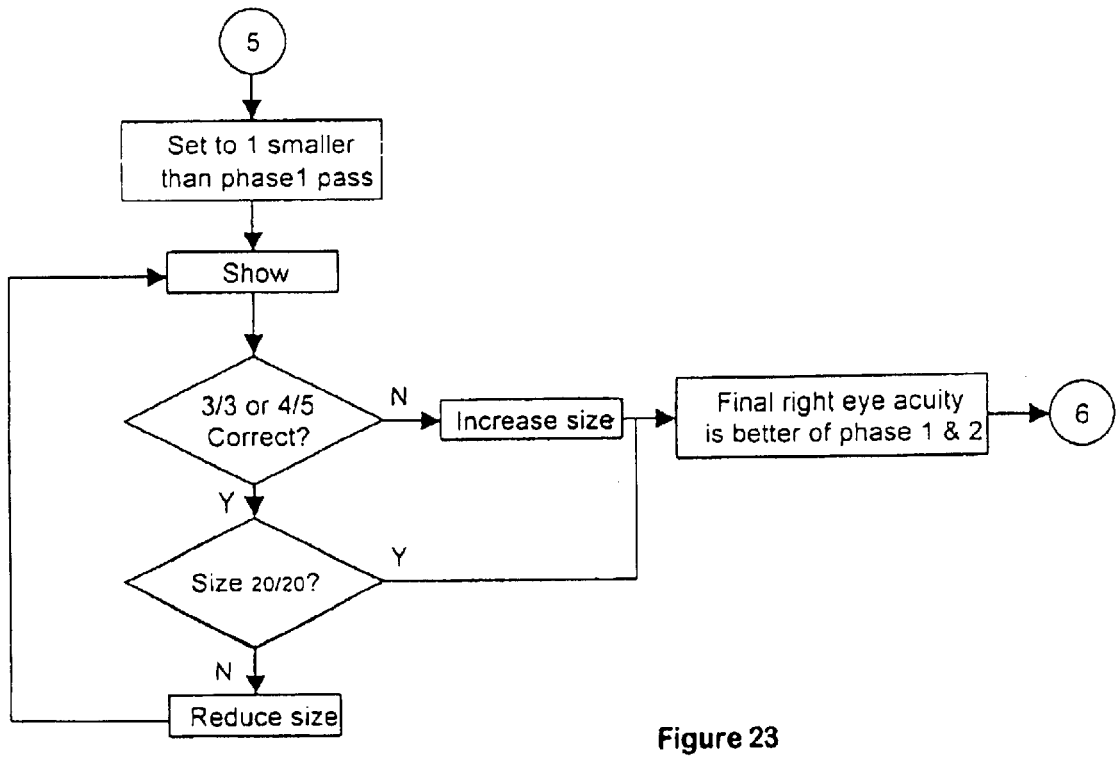
FIG. 23 is a program flow diagram of the monocular phase II of the screening test.

To initiate the visual acuity testing procedure, a visual acuity pre-test is imposed to insure comprehension of the rules of the game and to insure the validity of the visual acuity test results. The student experiences a seamless transition from the pre-test to visual acuity testing. He/she continues to drive a race car around a race track. He continues to make lane decisions based on the stimulus presented on the hood of the car, which is to be matched with a similar stimulus presented on a banner overlying one of three possible lane choices. The stimuli displayed are now letters (H, O, T, V) as shown in FIG. 4. During the pre-test (comprehension) phase, both eyes are able to view letters displayed on the banner. The binocular pre-test functional flow diagram is shown in FIG. 19 Screening then proceeds based on the Amblyopia Treatment Study Visual Acuity Testing Protocol (Archive of Ophthalmology Volume 119, September 2001, pages 1345–1352). The functional flow diagrams shown in FIGS. 20–23 describe the method for testing the right eye following the pre-test. The method is then repeated for the left eye. The diagrams show the functional flow from the initial screening of FIG. 18 through Phase I of the test shown in FIG. 21, the reinforcement phase of the test in FIG. 22, and the completion or Phase II of the test in FIG. 23. Based on the testing protocol, threshold visual acuity levels are determined for the right eye and left eye based on the student's selection of appropriate lane choices.

Figure 5:
FIG. 5 is an illustration of the test screen shown in FIG. 4 with the elements on the screen as they would appear at the decision datum.
Figure 6:
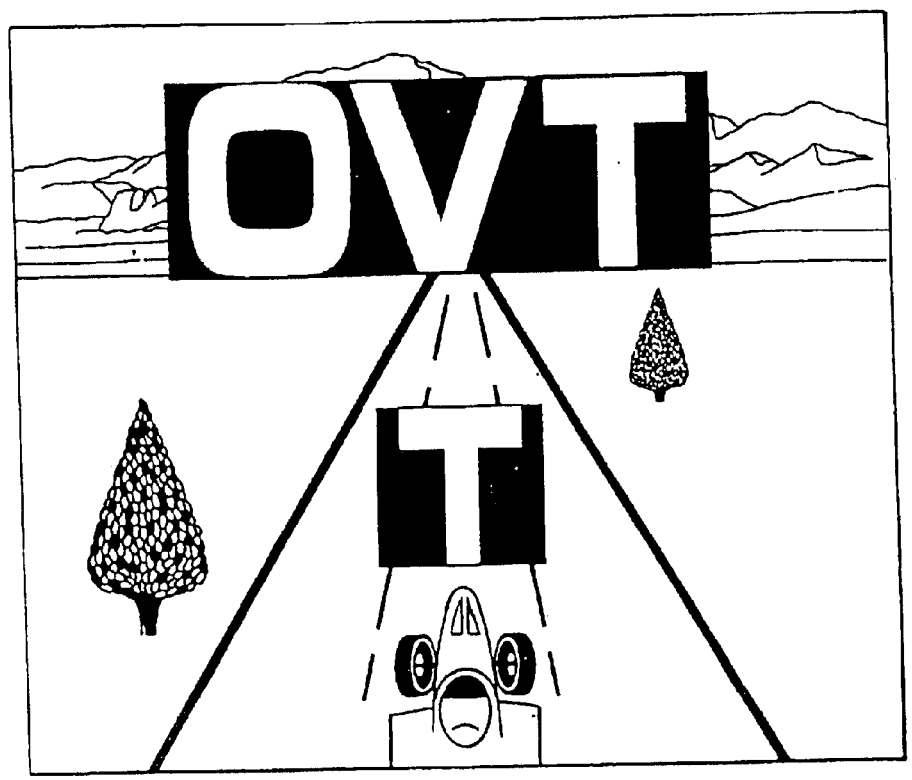
FIGS. 6 and 7 are illustrations of the letter banners viewed by the student test subject through the left and right eye respectively.
Figure 7:
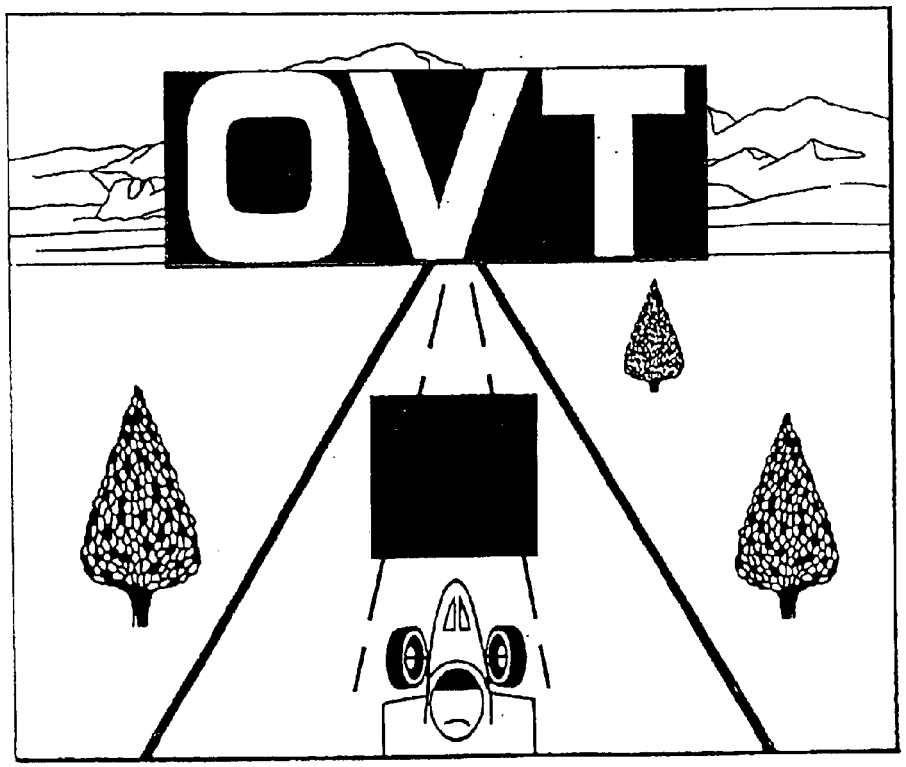

The standard for the test is the Snellen letter on the hood of the car. The banner letters are slightly oversized and used to present the target of the test pass. As shown in FIG. 4, the banners start at the horizon scaled small providing a depth cue and then grow in size as the car appears to "approach" the banner. The banner will pause at the decision gate, or position as shown in FIG. 5, allowing the student the make a final decision for the necessary lane change. The trees will continue in a steady progression during the entire pass to provide the illusion of steady motion. Using filtered lenses in glasses worn by the student, the student will only see through one lens at a time during the specific right eye/left eye portions of the test. During the right eye test portion, FIG. 6 is an example of the screen visible to the student during the test through the right eye; conversely, during the right eye test, as shown in FIG. 7, the letter is not viewable by the left eye.

Three out of three, or four out of five (3/3 or 4/5) correct lane choices are needed to establish a passing score at a given visual acuity threshold level. A reinforcement phase is used to ensure accuracy. The visual acuity is recorded for each eye and reported on the printout at the end of testing. Auditory feedback is given to reinforce correct decisions and discourage incorrect lane decisions. Laudatory comments or visual stimuli may be distributed for correct choices analogous to entertainment video game formats to encourage the student's attention and participation. As shown in the overview of the test procedure in FIG. 1C, if the visual acuity portion of testing was successfully completed, stereopsis, binocularity and eye alignment testing would proceed automatically. The results of the visual acuity portion of the testing procedure determines the successive tests to be performed upon the child. If the visual acuity test results in a determination that both eyes are 20/200 or worse, the test is terminated and the child is referred for a professional consultation. If the visual acuity test indicates that only one eye is worse than 20/200 or worse, then the test proceeds with a color vision test after which the test is ended and the child is referred. Under such conditions, testing for a stereopsis, binocularity or eye alignment would not be performed since it is believed that the results would be unreliable. Therefore, if one eye fails the visual acuity test, a color test is performed to assess whether this failure is on the basis of poor visual acuity or the basis of poor color vision. Regardless of the cause of the failure, and whether the failure was due to poor visual acuity in one eye or abnormal color vision, subsequent testing for stereopsis eye alignment and binocularity would be inaccurate and the test is therefore terminated. Even though a referral is indicated and inevitable and under these circumstances, the method of the present invention captures color vision data for diagnostic purposes and to correlate with professional examination results. The color vision test may then proceed using the race car motif already described in connection with the completed visual acuity test.

Figure 3B:
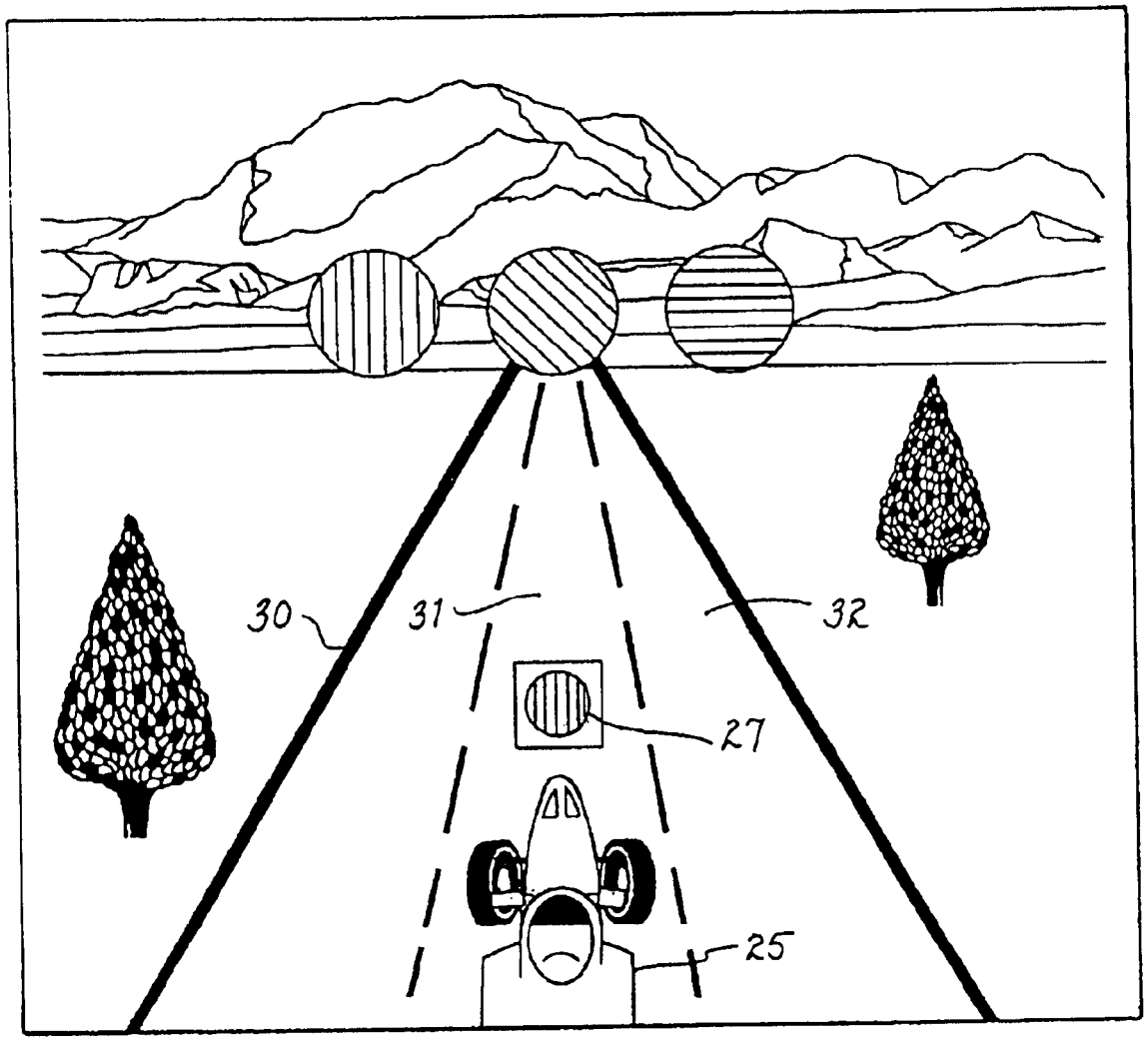
FIG. 3B is an illustration of the starting position of a screening test for color vision.

Referring to FIG. 3B, a race car 25 appears on the screen and is driving down a race track. A circle 27 containing a primary color (red, green, blue) is visible on the hood of the race car. In the distance, the roadway splits into three lanes 30, 31, and 32. Above each lane is a banner containing a unique colored circle 35, 36, and 37 respectively. One of the colors corresponds to the colored circle on the race car hood. Auditory instructions are given to choose the lane with the colored circle that matches the hood of the race car. A response is made by the student using the input device to line up the race car in the appropriate lane. Pre-testing continues until comprehension of the game is statistically assured (3 correct responses in a row or 4 out of 5 correct=96% chance not random guessing). If the student fails the pre-test, auditory instructions are repeated and the pre-test is repeated. Failure to pass the pre-test a second time results in the termination of the testing. The termination is recorded as an incomplete test due to lack of cooperation or lack of comprehension on the printout display.

Once the pre-test level has been successfully completed, testing is initiated. Using the same testing format of matching a color on the hood of the race car to a color on a banner over 1 of 3 possible lane choices, testing for common red-green color deficiencies is initiated. The different colors displayed on the roadway banners correspond to color commonly confused in individuals with color deficiencies. The color corresponding to the correct lane choice will randomly change among the lanes so that active recognition and response is required by the student in order to determine the presence or absence of color abnormalities. Statistically, 3 of 3 or 4 of 5 correct lane changes will be considered as a passing response. A minimum of 12 to a maximum of 18 lane decisions will be necessary to determine a child's color vision status. Results of color vision will be printed at completion of testing and include not only a pass/fail component but the type of color deficiency present (red or green). It should be noted that color deficiencies are genetic and occur in both left and right eyes equally. Therefore, each eye does not need to be tested separately.

If the visual acuity test results in an indication that both eyes are 20/200 or better, the tests proceeds seamlessly to the stereopsis test followed by the binocularity test. If the results of the binocularity test indicate that the child is suppressing one eye, the test is ended and the child is referred for professional analysis. If the binocularity test indicates normal binocularity or double vision, an eye alignment test is conducted and the child is thereafter referred, if needed, for professional examination.

Figure 11:
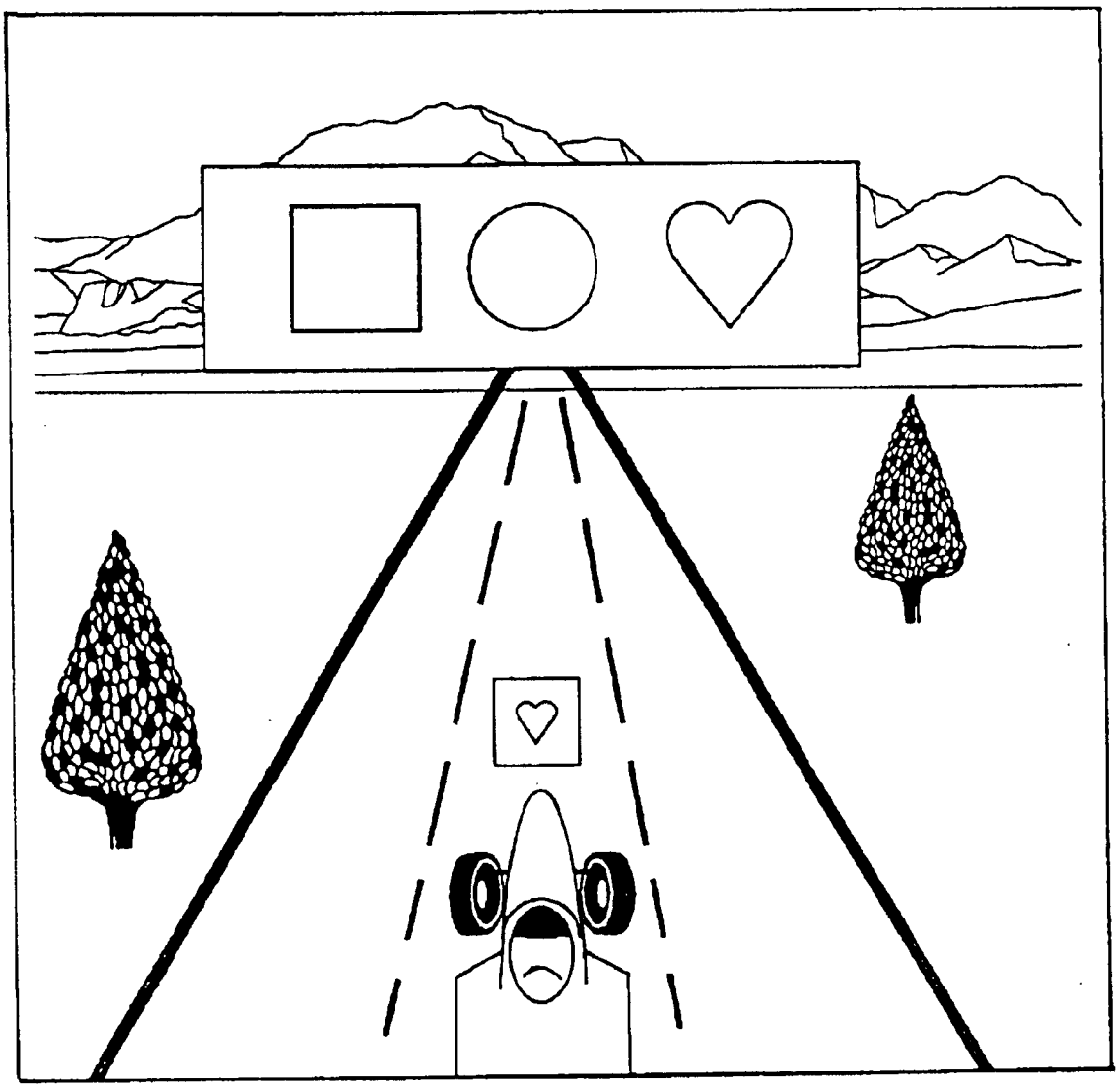
FIG. 11A is a schematic illustration of the test screen useful for describing the stereopsis test used in the method of the present invention.
FIG. 11B is a schematic illustration of the test screen useful for describing the binocularity test used in the method of the present invention.
Figure 11:
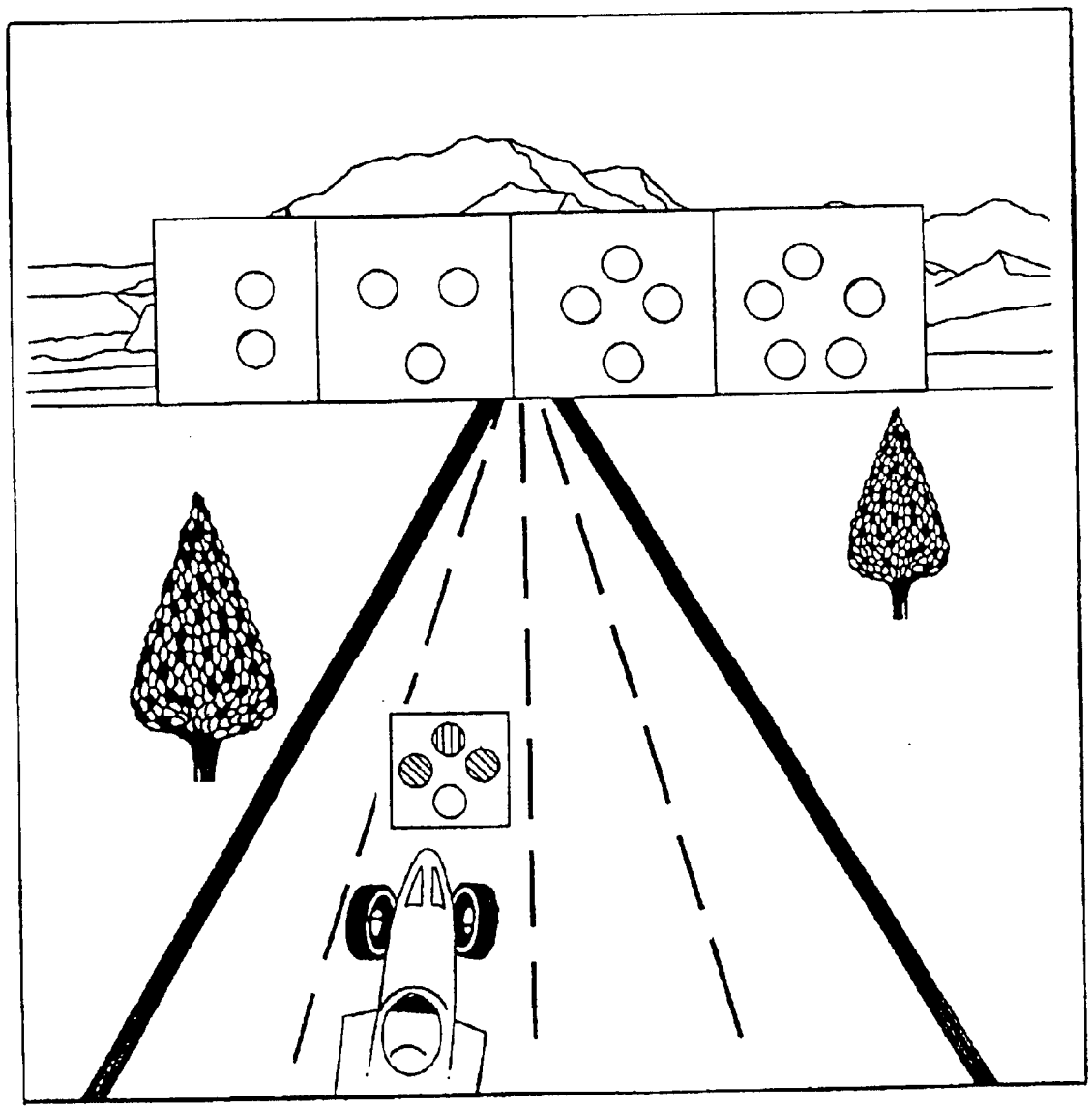

The basic testing format for use in the test for stereopsis remains the same as that used in the visual acuity portion of the test procedure and includes a stimulus on the hood of the race car to be matched with a corresponding stimulus on a banner overlying one of three possible lane choices. Random dots are used, which create no distinguishable pattern if presented to only one eye or the other. However, when presented to both eyes simultaneously, a three dimensional image is created. In a manner analogous to color vision and visual acuity testing, this three dimensional image can be displayed on the hood of the race car and matched with a similar image presented on the banner overlying one of three lane choices. A schematic representation of a test screen is shown in FIG. 11A. In FIG. 11A a three dimensional image in the form of a heart-shape is presented on the hood of the race car so that the student can select the third lane as the appropriate lane to match the corresponding image shown in the banner. Children without adequate stereopsis will be unable to discern the image presented on the race car and the selection of a lane will be a random selection. These stereo acuity selections are based on the "Randot" Preschool Stereo Acuity tests available in clinical practice A pre-test evaluation to ensure comprehension similar to the color vision and visual acuity testing formats is performed. In the stereopsis pre-test phase, the random image is visible to either the left or the right eye independently to confirm comprehension. Testing then will proceed to establish the level of stereopsis at 600 seconds/arc, 200/sec/arc, or 40 sec/arc. The correct lane choices will be invisible to children without adequate stereopsis (only dots will be visible) and will result in random lane selection. 3/3 or 4/5 correct lane decisions will demonstrate the presence of stereopsis at the threshold level being tested. Results of stereopsis testing will be printed automatically at the end of the vision assessment evaluation.

Children deemed age appropriate who successfully pass the visual acuity portions of the test described above will progress to the binocularity test. Referring to FIG. 11B, the test comprises the utilization of the same race car motif wherein the race car is provided with a pattern on the hood of the car that is formed of four dots incorporating a red, a white, and two green dots selected in accordance with the Worth 4-Dot test technique. The race track now contains four lanes, each corresponding to a dot pattern located in the banner position above the race track. The banner incorporates the dot pattern according to the above mentioned Worth 4-Dot test wherein all dots are white but arranged in different patterns. As stated previously, special eye glasses are worn during the test; if the glasses incorporate colored lenses to disassociate the two eyes, then the red lens is worn over the right eye and cyan lens is worn over the left eye. While wearing such eye glasses to disassociate the eyes, only red or white lights are visible to the right eye and only blue or white lights are visible to the left eye. By presenting the banner as shown in FIG. 11B with the white dot patterns, and by showing the multi-colored pattern on the hood of the race car, it is possible to determine whether normal binocularity, right eye suppression, left eye suppression or double vision exists by which of the four possible responses or lane choices is made by the child under test. If the child chooses the lane with two dots, then left eye suppression exists; if the child chooses the lane represented by three dots, then right eye suppression exists. Similarly, a lane choice corresponding to the four dots in the banner indicates normal binocularity while the choice of the lane corresponding to the five dots is indicative of double vision.

Upon completion of the binocularity test, if the test resulted in an indication that the child is suppressing one eye, the test is terminated and the child is referred for professional consultation. If the binocularity tests indicates that the child has either normal or double vision, the test proceeds seamlessly to an eye alignment test.

Figure 12:
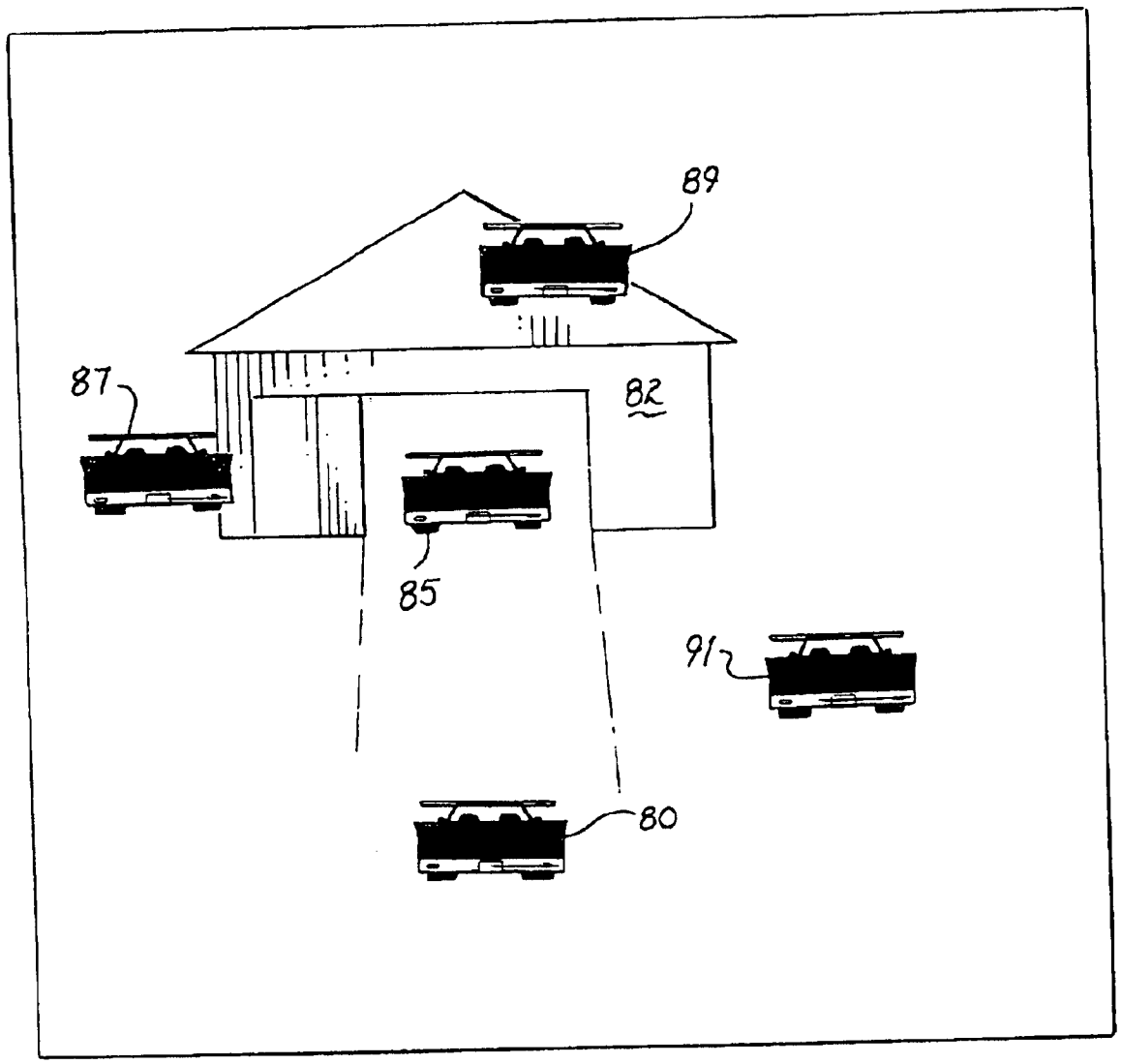
FIG. 12 is a schematic illustration of displayed images useful for describing the eye alignment test used in the method of the present invention.

Eye alignment will be evaluated using the principle of a troposcope. The troposcope presents separate images to each eye and then measures whether a realignment response is necessary to bring the two images together. In the raceway format used in the described embodiment, the student will be asked to park his race car inside a garage. Referring to FIG. 12, the race car 80 will be visible to only one eye and the garage 82 will be visible only to the other. If the eyes are well aligned, the race car will be parked directly into the garage as shown in position 85. If the eyes are not well aligned, the images will not be superimposed properly. What appears to the student as proper positioning of the car in the garage will actually result is the car being placed outside of the garage if eye misalignment is present. It will be possible to determine both the direction of eye misalignment (esodeviation or exodeviation) as well as the approximate degree of eye misalignment based on the working distance from the screen and the distance the car is parked outside of the garage. The position of the car 80 is the starting position; the car will advance under the control of the student until the vehicle appears to the student to be appropriately parked within the garage 82. If the student successfully positions the vehicle at the position 85, the student is considered to have passed. If, however, the student positions the vehicle at 87 (exophoria) or above or behind the garage as suggested by the position 89 (hyperphoria) or in a mixed mispositioning as shown at 91 (mixed hyperphoria and exophoria) the deviation of the positioning of the vehicle is determined. If the car is parked within a predetermined number of prism diopters on either side of the garage, the student passes. As used herein, one prism diopter equals the angular deviation of one centimeter per meter. If the car is parked more than the predetermined number of prism diopters on either side of the garage, the student fails. The degree and direction of tropic can be measured vertically or horizontally. Results of eye alignment testing will be printed automatically at the end of the test. Like stereopsis, this portion of the test would not be performed if inadequate visual acuity is demonstrated based on visual acuity testing earlier in the testing protocol.

Upon completion of the eye alignment evaluation, a determination is made whether or not a student re-test is appropriate. There are several reasons for retesting a student. Suspected, or known, student distraction (e.g.—interruption of test procedure) or lack of comprehension. In either event, the proctor will probably want to retest the student. Although student history is usually not maintained in the local database beyond one year, these situations are responded to and recorded differently.

If, during game play, the student stops responding for 5 seconds, the game will verbally request an active response from the student. If there is no response for another 5 seconds, the game stops and the screen and printout show, "Incomplete Test—Student stopped responding". This student can have the test repeated and will be treated as a first time student. The number of retests required for "stopped responses" and the results of the retesting will be saved, however only the result of the second test is used for epidemiological analysis.

If the student actively fails vision screening the proctor may decide to verify/confirm comprehension and retest the student. The student may not have understood or been distracted but continued to actively respond with the game. If the student fails the retest the student will be referred. If the student passes the retest the student will not be referred. The number of retests performed and the results of the retesting will be saved, however only the result of the second test is used for epidemiological analysis.

Upon completion of the test the student results are printed in a form such as that shown in FIG. 8. The report provides the test results for color vision, visual acuity, stereopsis, and binocularity. In the event that the screening results suggest that the student should be referred to an eye care professional, a message to that affect will be prominently displayed in the report together with the possibility of suggested conveniently local eye professionals. In addition to the overall basic results of the screening test, a detailed test report shown in FIG. 9 is provided to more clearly define the results of the test and to provide a format for presentation to the eye professional in the event the student visits the recommended eye professional for consultation. Detailed reports showing the exact information recorded by the system during screening, such as the visual acuity screening of the right eye shown in detail in FIGS. 10A and 10B, is stored along with all of the information relating to the screening test of the specific student. The circles in FIGS. 10A and 10B represent successful lane changes or choices at the particular relevant decision points during the game play. The "x's" represent incorrect lane choices at the particular decision point during the game play. It may be noted, for example, that the encircled notation 20/30 shown in the chart under phase 2 of FIGS. 10B indicates the final acuity level or value determined for that specific eye (in the case chosen for illustration, the right eye). This information is transmitted to a remote data center 20 (FIG. 1). This central repository of data is available for analysis and is accessible to permit the evaluation of important statistical data.

Figure 13:
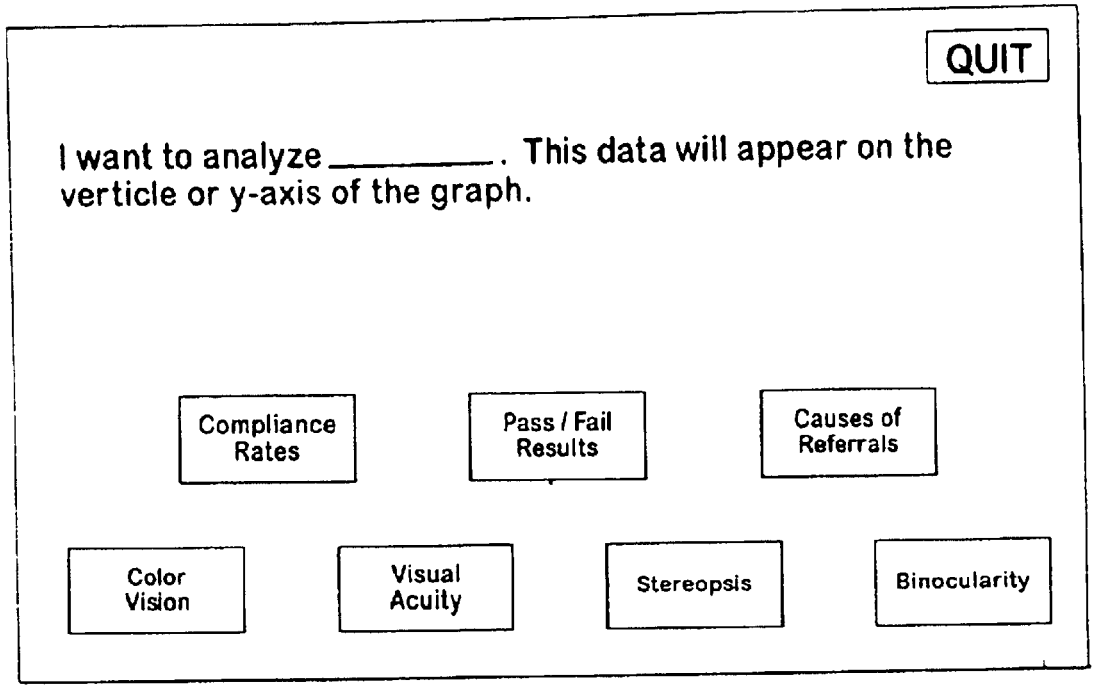
FIGS. 13, 14, 15, and 16 are illustrations of data analysis screens to facilitate the selection of relevant data for the generation of a bar graph for test data analysis.
Figure 14:
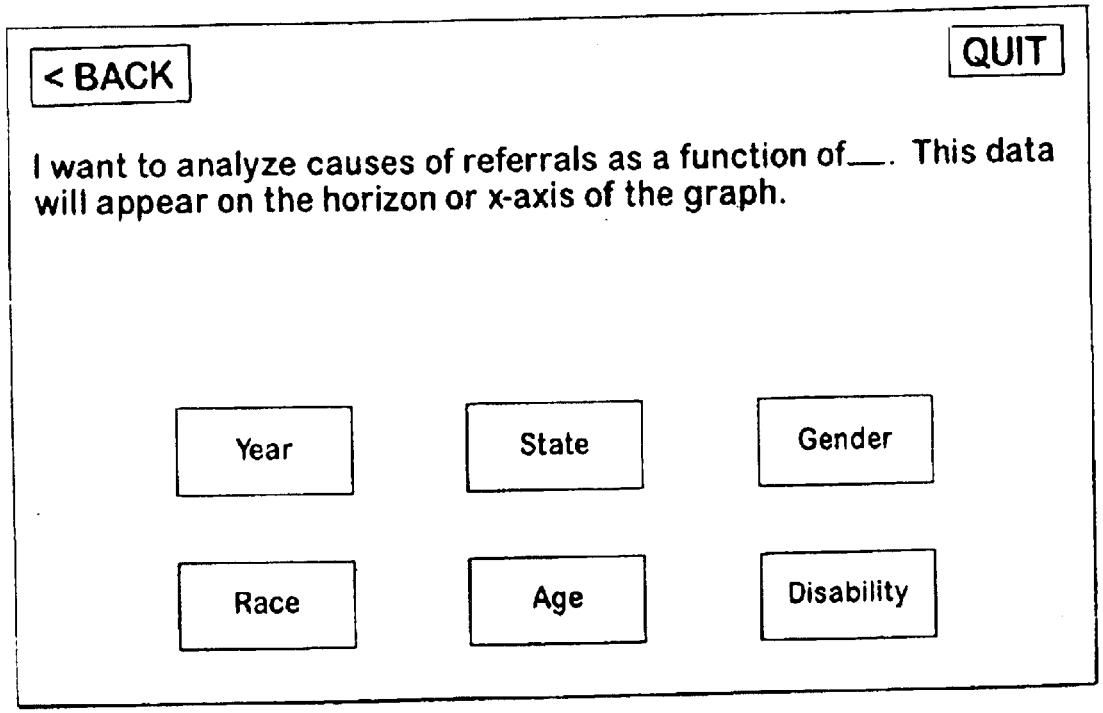
Figure 15:
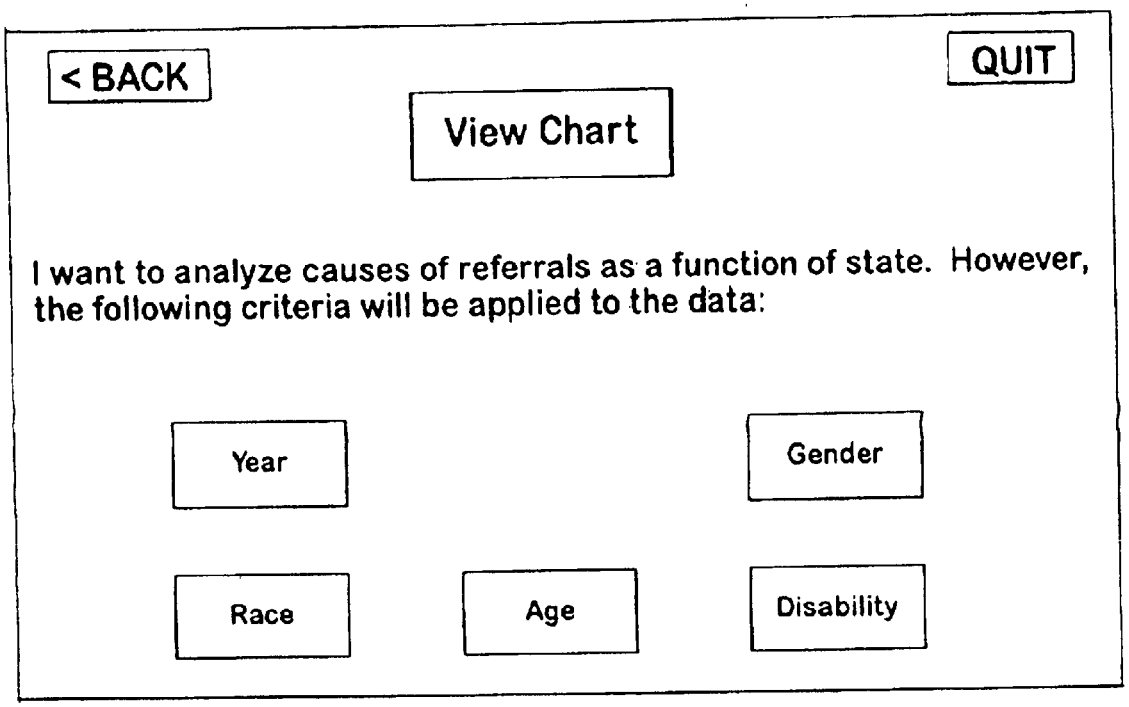
Figure 16:
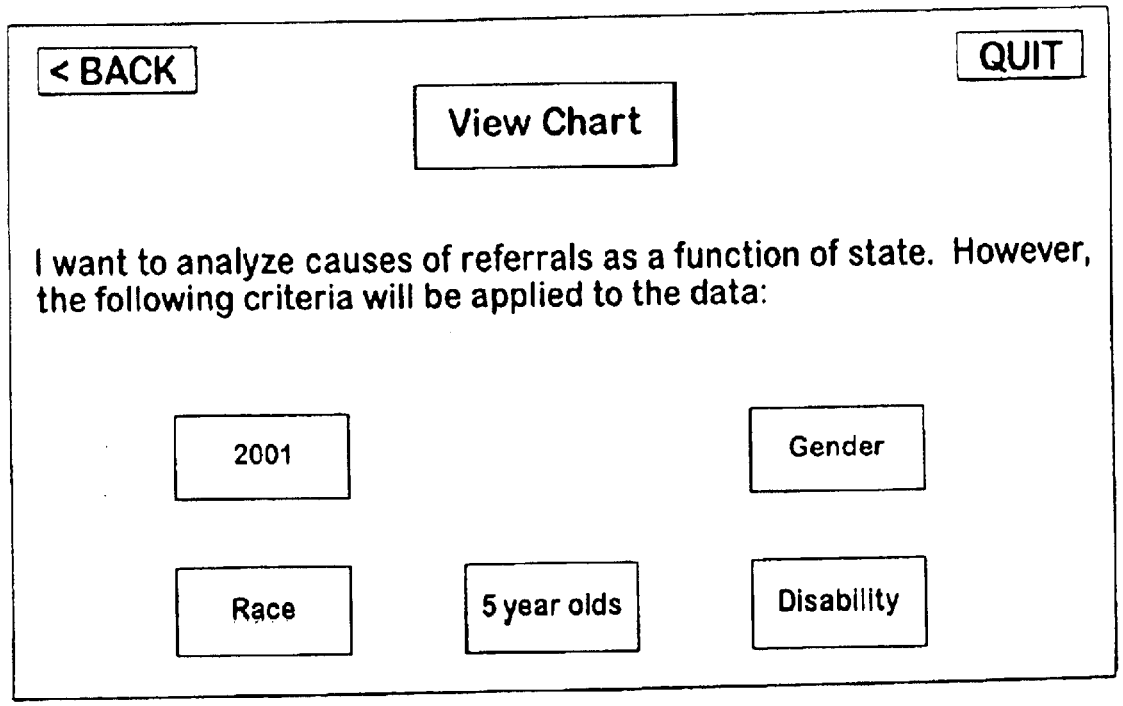
Figure 17:
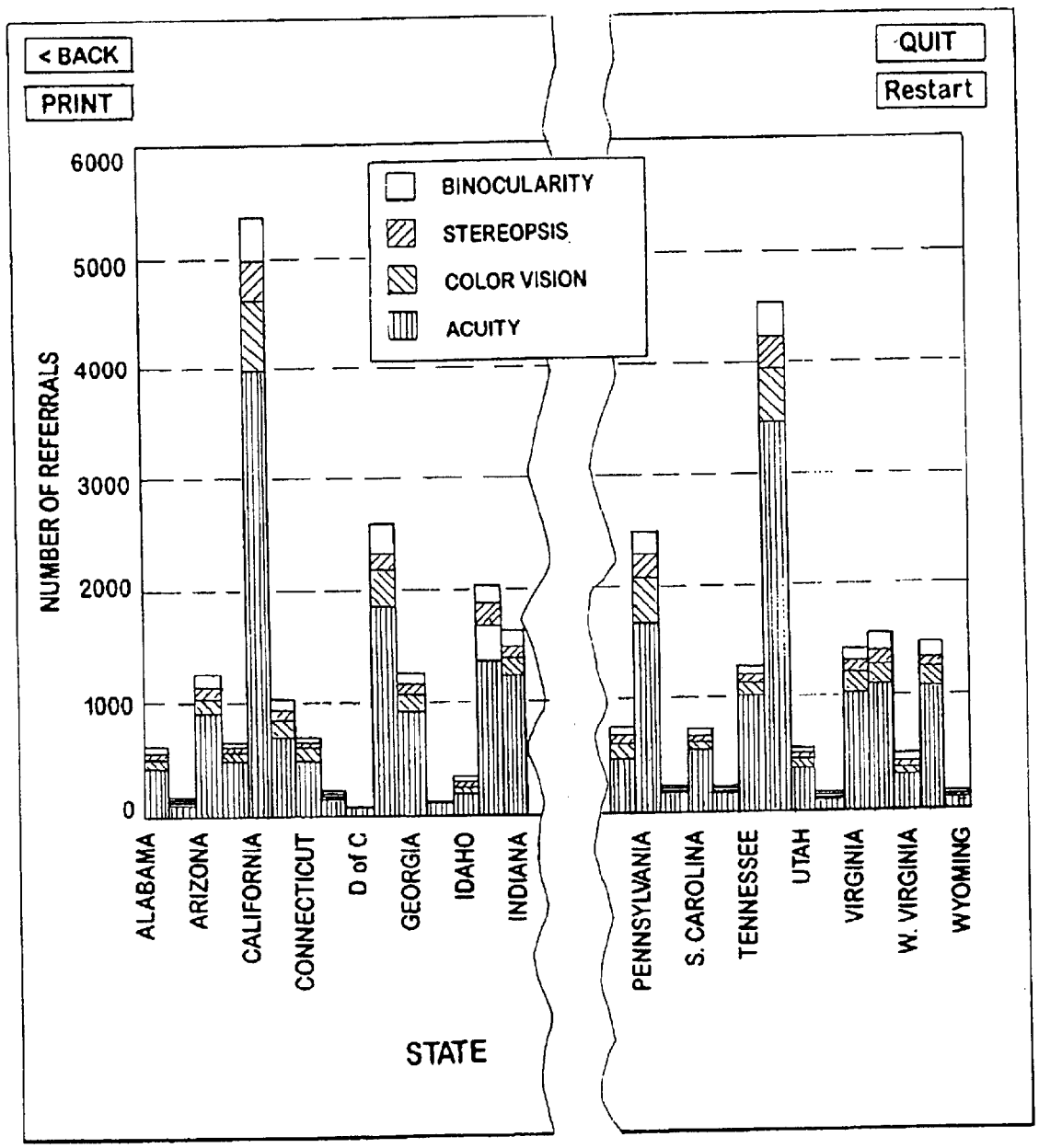
FIG. 17 is an illustration of a bar graph generated by the selection of relevant data stored in the system and made available for analysis.

For epidemiological analysis, the central repository of data provides virtually limitless options for studies at any level. Using the system of the present invention, the following is a description of the creation of a desired report based upon the information stored as the result of the screening tests. The data is made available for analysis interactively in accordance with a chosen protocol. Investigators communicating with the interactively available data such as individual researchers may create their own protocol and generate reports through interactive communication with the remote data center. For example, a communicating investigator or researcher may want a comparative display of the number of referrals to eye care professionals for each of four vision screening tests in each State for a given year. Referring to FIG. 13, a first of a series of screen presentations is shown and which presents a selection of inquiries to the researcher. The screen is interactive and the selection, for example, of the "button" entitled "causes of referrals" advances the system to the presentation of the screen shown in FIG. 14. The researcher having chosen to analyze the database collected by the screening tests to determine the causes of referrals, the researcher is now presented with a selection of data titles; the selection of the "button" entitled "state" presents a screen shown in FIG. 15 to the researcher. This screen provides the researcher with a number of criteria that will be applied to the data that the researcher is accessing. Selection of the button "year" results in the presentation of the screen shown in FIG. 16 to the researcher wherein a plurality of criteria are presented to the researcher to be applied to the selection of data that has previously been chosen by the researcher. The generation of the chart is accomplished by selecting the "view chart" button which results in the presentation of the data and the format is shown in FIG. 17. It may be seen that the data is arranged by number of referrals on the ordinate and the respective states on the abscissa. Further, each of the bars is provided with a characteristic color to show the results of the tests relating to visual acuity, color vision, stereopsis, and binocularity, respectively.

Since the collected screening data has been gathered utilizing information provided by the respective school systems showing the individual student personal profile data as well as information relating to testing location, and school particulars, the data in the database can be analyzed not only according to state, but in further detail from national, to state, to county, to school district within the county, and to individual school. FIG. 18 is a screen presentation showing the results of successive selection of geographical alternatives to arrive at the presentation of information chosen by the researcher to analyze causes of referrals as a function of year but focused on the State of Arizona, the County of Maricopa within that state, a particular school district within that county, and a specific school within that school district; it may therefore be seen that the data analysis system provided by the system of the present invention offers unlimited analysis possibilities by researchers or others by the simple access to centralized database created as a result of the collection of screening data in accordance with the system of the present invention. Further, no formalized training is necessary to gain access to answers to some fundamental, and statistically important, information.

While the invention has been particularly shown and described herein with reference to a preferred embodiment thereof, it will be understood by those skilled in the art that various other modifications and changes may be made to the present invention from the principles of the invention as herein described without departing from the spirit and scope as encompassed in the accompanying claims. Therefore, it is intended in the appended claims to cover all such equivalent variations which may come within the scope of the invention as described.

What is claimed is:

1. A method for automatically screening for visual dysfunctions in pre-literate or school-age test subjects comprising:
    (a) providing the test subject with eye glasses;
    (b) initiating a selected standardized test procedure, incorporating an interactive video game readily comprehensible by pre-literate and school-age test subjects, with said test subject by, establishing an exclusive dialog between said test subject and a PC system;
    (c) collecting test results in said PC system and creating a test record incorporating test results;
    (d) printing said test results for presentation to said test subject;
    (e) transmitting said test results to an off-site repository for storage with test results of other test subjects;
    (f) generating an epidemiological analysis of said stored test results together with the test results of other test subjects in accordance with a selected analysis protocol chosen by a communicating investigator; and
    (g) printing a report representing said analysis.

2. The method set forth in claim 1 wherein said test procedure is first directed to testing visual acuity.

3. The method set forth in claim 1 wherein said test procedure is first directed to testing visual acuity and then directed to testing stereopsis.

4. The method set forth in claim 1 wherein said test procedure is first directed to testing visual acuity and stereopsis and then directed to testing binocularity.

5. The method set forth in claim 1 wherein said test procedure is first directed to testing visual acuity and then directed to testing color vision.

6. The method set forth in claim 1 wherein said selected test procedure includes a demonstration phase for instructing the test subject on the manner in which the interactive video game is played.

7. The method set forth in claim 1 wherein said selected test procedure includes a comprehension phase to ascertain the comprehension of the interactive video game by the test subject.

8. The method set forth in claim 1 wherein said selected test procedure includes a reinforcement phase incorporating a retesting procedure to confirm a previously completed test phase.

9. A method for automatically screening for visual dysfunctions in pre-literate or school-age test subjects comprising:
    (a) collecting personal profile and background information of a test subject;

(b) transferring said information to a local storage system;

(c) retrieving said information from said local storage system into a PC system for use in testing said test subject;

(d) providing the test subject with eye glasses;

(e) initiating a selected standardized test procedure, incorporating an interactive video game readily comprehensible by pre-literate and school-age test subjects, with said test subject by establishing an exclusive dialog between said test subject and said PC system;

(f) collecting test results in said PC system and creating a test record incorporating said test results and said information;

(g) printing said test results for presentation to said test subject;

(h) transmitting said test results and information to an off-site repository for storage with test results and information of other test subjects;

(i) generating an epidemiological analysis of said stored test results and information by analyzing the test results and information together with the test results and information of other test subjects in accordance with a selected analysis protocol chosen by a communicating investigator; and (j) printing a report representing said analysis.

10. The method set forth in claim 9 wherein said test procedure is first directed to testing visual acuity.

11. The method set forth in claim 9 wherein said test procedure is first directed to testing visual acuity and then directed to testing stereopsis.

12. The method set forth in claim 9 wherein said test procedure is first directed to testing visual acuity and stereopsis and then directed to testing binocularity.

13. The method set forth in claim 9 wherein said test procedure is first directed to testing visual acuity and then directed to testing color vision.

14. The method set forth in claim 9 wherein said selected test procedure includes a demonstration phase for instructing the test subject on the manner in which the interactive video game is played.

15. The method set forth in claim 9 wherein said selected test procedure includes a comprehension phase to ascertain the comprehension of the interactive video game by the test subject.

16. The method set forth in claim 9 wherein said selected test procedure includes a reinforcement phase incorporating a retesting procedure to confirm a previously completed test phase.

17. A method for automatically screening for visual dysfunctions in pre-literate or school-age test subjects comprising:

(a) providing the test subject with eye glasses;

(b) initiating a selected standardized test procedure, incorporating an interactive video game readily comprehensible by pre-literate and school-age test subjects, with said test subject by establishing an exclusive dialog between said test subject and a PC system;

(c) collecting test results in said PC system and creating a test record incorporating test results;

(d) printing said test results for presentation to said test subject;

(e) transmitting said test results to an off-site repository for storage with test results of other test subjects to enable epidemiological analysis of said stored test results.

18. A method for automatically screening for visual dysfunction in pre-literate or school-age test subjects comprising:

(a) collecting personal profile and background data relating to a test subject and entering the data into a PC system for selecting a standardized test procedure in response to said collected data, said test procedure incorporating an interactive video game comprehensible by said test subject to be played on said PC system;

(b) providing the test subject with eye glasses;

(c) establishing an exclusive dialog between said test subject and said test procedure on said PC system;

(d) collecting test results in said PC system and creating a test record incorporating said test results and said data; and (e) transmitting said test results and data to an off-site repository for storage with test results and data of other test subjects.

19. A method for automatically screening for visual dysfunction in pre-literate or school-age test subjects comprising:

(a) collecting personal profile and background data relating to a test subject and entering the data into a PC system for selecting a standardized test procedure in response to said collected data, said test procedure incorporating an interactive video game comprehensible by said test subject to be played on said PC system;

(b) providing the test subject with eye glasses;

(c) establishing an exclusive dialog between said test subject and said test procedure on said PC system;

(d) modifying said video game in response to the test subject's interaction with said video game;

(e) collecting test results in said PC system and creating a test record incorporating said test results and said data; and (f) transmitting said test results and data to an off-site repository for storage with test results and data of other test subjects.

20. A method for automatically screening for visual dysfunctions in pre-literate or school-age test subjects comprising:

(a) collecting personal profile and background data relating to a test subject and entering the data into a PC system for selecting a test procedure in response to said collected data, said test procedure incorporating an interactive video game comprehensible by said test subject to be played on said PC system;

(b) establishing an exclusive dialog between said test subject and said test procedure on said PC system;

(c) initiating a visual acuity test with said test subject;

(d) terminating said test procedure in response to a failure of both of the test subject's eyes to pass said visual acuity test;

(e) initiating a color vision test with said test subject in response to the failure of only one of the test subject's eyes to pass said visual acuity test;

(f) initiating a stereopsis and a binocularity test in response to the passing of the visual acuity test by both eyes of said test subject;

(g) terminating said test procedure if said test subject suppresses either eye;

(h) initiating an eye alignment test in response to normal or double vision of the test subject;

(i) terminating said test procedure;

(j) collecting test results in said PC system and creating a test record incorporating said test results and said data; and (k) transmitting said test results and data to an off-site repository for storage with test results and data of other test subjects.

21. The method of claim 20 including generating an epidemiological analysis of said stored test results and data by analyzing the test results and data together with the test results and data of other test subjects in accordance with a selected analysis protocol chosen by a communicating investigator.

22. The method of claim 20 including printing a report representing said analysis.

23. The method of claim 20 including printing said test results for presentation to said test subject.

24. A method for automatically screening for visual dysfunction in pre-literate or school-age test subjects comprising:

(a) collecting personal profile and background data relating to a test subject and entering the data into a PC system;

(b) providing the test subject with eye glasses;

(c) initiating an exclusive dialog between said test subject and said PC wherein said PC selects a standardized interactive video game readily comprehensible by said test subject based upon the data entered into said PC;

(d) selecting default response timing for the selected game;

(e) adjusting the response timing for the selected game in accordance with the response times of the test subject;

(f) collecting test results in said PC system and creating a test record incorporating test results; and (g) transmitting said test results to an off-site repository for storage with test results of other test subjects to enable epidemiological analysis of said stored test results.

25. The method of claim 24 including the step of printing said test results for presentation to said test subject.

26. The method of claim 24 including the steps of printing said test results for presentation to said test subject; generating an epidemiological analysis of said stored test results and information by analyzing the test results and information together with the test results and information of other subjects in accordance with a selected analysis protocol by a communicating investigator and printing a report representing said analysis.

* * * * *